United States Patent
Naito

(10) Patent No.: US 6,538,786 B1
(45) Date of Patent: Mar. 25, 2003

(54) OPTICAL COMMUNICATION SYSTEM AND OPTICAL RECEPTION APPARATUS USING SYNCHRONOUS POLARIZATION SCRAMBLER

(75) Inventor: Takao Naito, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/111,772

(22) Filed: Jul. 8, 1998

(30) Foreign Application Priority Data

Feb. 20, 1998 (JP) .......................................... 10-039163

(51) Int. Cl.$^7$ .......................... H04B 10/00; H04B 10/04
(52) U.S. Cl. ........................................ 359/156; 359/181
(58) Field of Search ............................ 359/156, 121, 359/192, 118, 193, 194, 181

(56) References Cited

U.S. PATENT DOCUMENTS

| | | | | |
|---|---|---|---|---|
| 4,965,857 A | * | 10/1990 | Auracher et al. | 455/618 |
| 5,150,236 A | * | 9/1992 | Patel | 359/71 |
| 5,159,481 A | * | 10/1992 | Maeda | 359/189 |
| 5,247,382 A | * | 9/1993 | Suzuki | 359/156 |
| 5,600,474 A | * | 2/1997 | Tomesen et al. | 359/192 |
| 5,611,005 A | * | 3/1997 | Heismann et al. | 385/11 |
| 5,841,571 A | | 11/1998 | Terahara | 359/341 |
| 5,912,755 A | * | 6/1999 | Bergano | 359/181 |
| 5,920,413 A | * | 7/1999 | Miyakawa et al. | 359/130 |
| 6,023,360 A | * | 2/2000 | Morioko et al. | 359/123 |
| 6,052,221 A | | 4/2000 | Terahara | 359/341 |

FOREIGN PATENT DOCUMENTS

| FR | 2 735 930 | 12/1996 |
|---|---|---|
| JP | 2-36621 | 2/1990 |
| JP | 8-116310 | 5/1996 |
| JP | 9-8742 | 1/1997 |
| JP | 9-149006 | 6/1997 |

OTHER PUBLICATIONS

Naito et al., "PDL–Induced Noise Reduction in Long–Haul Transmission Systems Using Synchronous Polarization Scrambling." Sep. 1998, ECOC , 20–24, pp. 683–684.*

N.S. Bergano, et al., "Bit–Synchronous Polarisation And Phase Modulation Scheme For Improving The Performance of Optical Amplifier Transmission Systems", Electronics Letters, IEE Stevenage, GB, vol. 32, No. 1, Jan. 4, 1996, pp. 52–54.

S. Herbts, et al., "Sensitivity Of A Direct WDM–System With A Frequency Selective Optical Receiver And Optical Preamplifier", Journal of Lightwave Technology, IEEE. New York, U.S., vol. 16, No. 1, 1998, pp. 32–26, XP000739107.

* cited by examiner

Primary Examiner—Leslie Pascal
Assistant Examiner—Dalzid Singh
(74) Attorney, Agent, or Firm—Staas & Halsey LLP

(57) ABSTRACT

Signal light output from a signal light generator of a light transmitter is synchronous polarization scrambled in a polarization scrambler in accordance with a modulation signal of a repetition frequency fo which approximately coincides with bit rate, and then transmitted to an optical receiver via a transmission system. The optical receiver photoelectric converts and amplifies the received signal light and then sends this to a band reject filter. The band reject filter intercepts only the noise component of a repetition frequency fo and noise components in the vicinity thereof which are produced by the synchronous polarization scrambling, while other signal components are sent to an equalizing filter and decision circuit. As a result, there is provided an optical communication system and reception apparatus wherein the noise component produced at the time of transmitting the synchronous polarization scrambled signal light is reduced so that deterioration of reception characteristics is prevented.

18 Claims, 20 Drawing Sheets

FIG.4
(a)
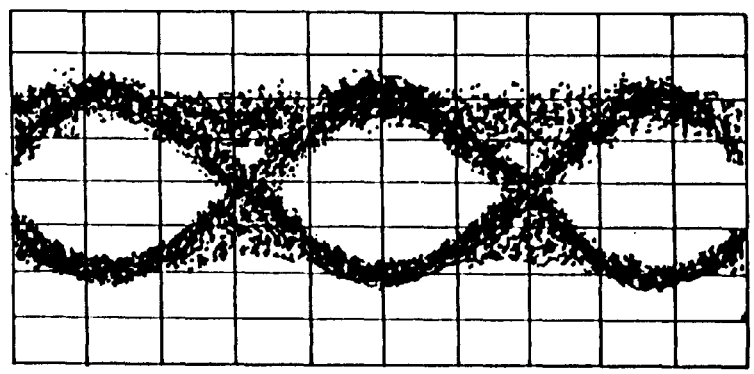
X-AXIS: 100 ps/div., Y-AXIS: 100 mV/div.
(b)
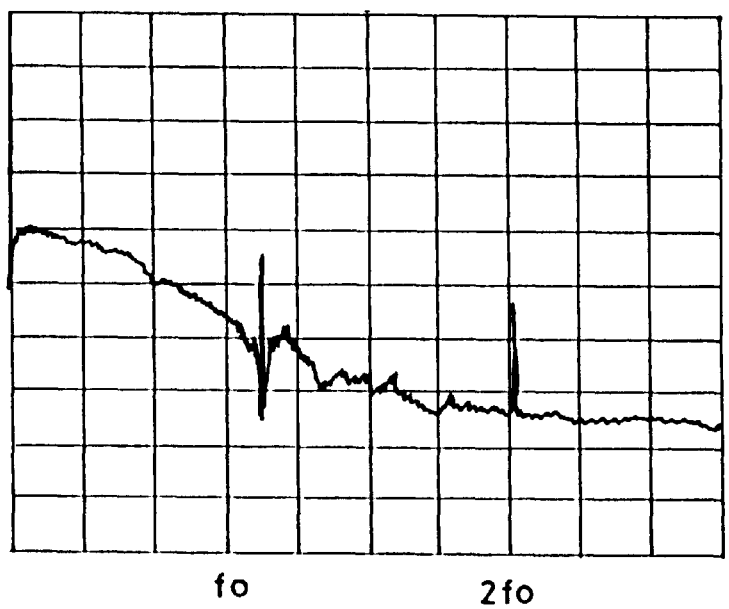
X-AXIS: CENTER 7.5GHz, SPAN 1.5 GHz/div., Y-AXIS: 10 dB/div.

MONITORING SIGNAL OUTPUT

FIG.23
(a)
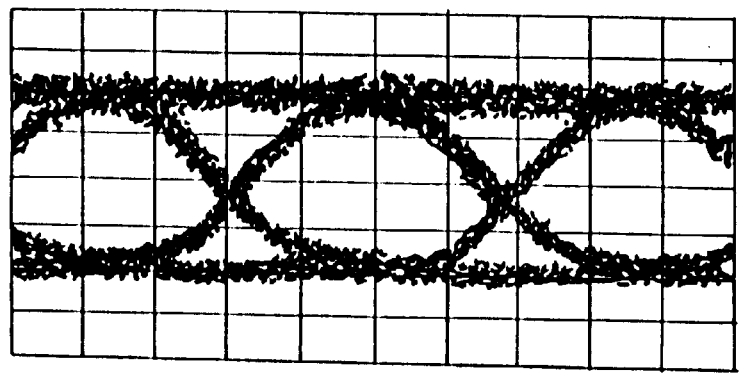
X-AXIS: 100 ps/div., Y-AXIS: 100 mV/div.
(b)
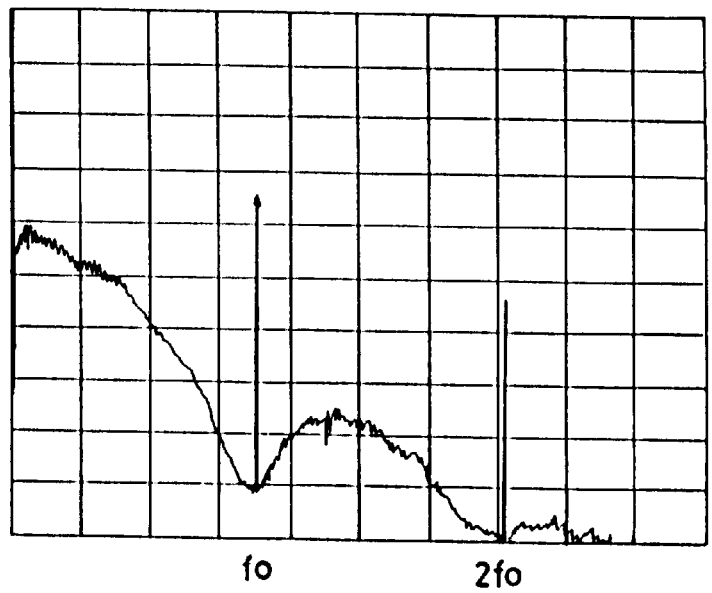
X-AXIS: CENTER 7.5GHz, SPAN 1.5 GHz/div., Y-AXIS: 5 dB/div.

FIG.24
(a)
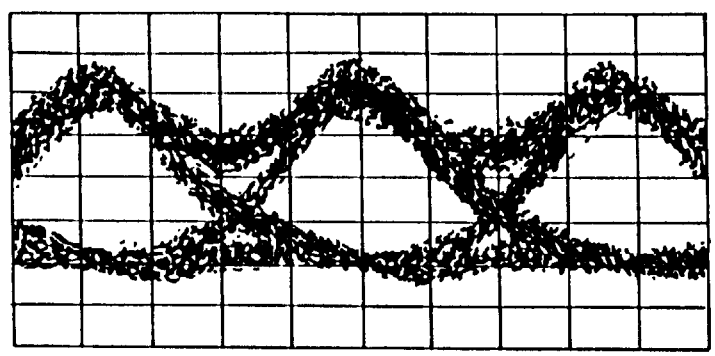
X-AXIS: 100 ps/div., Y-AXIS: 100 mV/div.
(b)
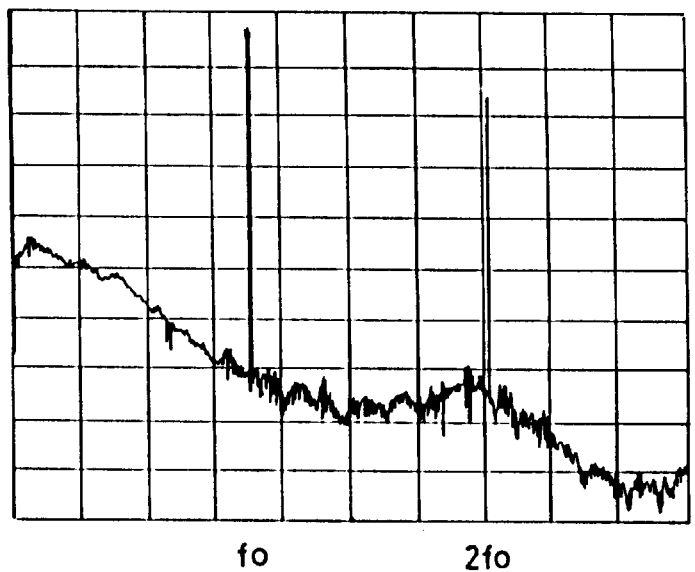
X-AXIS: CENTER 7.5GHz, SPAN 1.5 GHz/div., Y-AXIS: 5 dB/div.

FIG.25
(a)
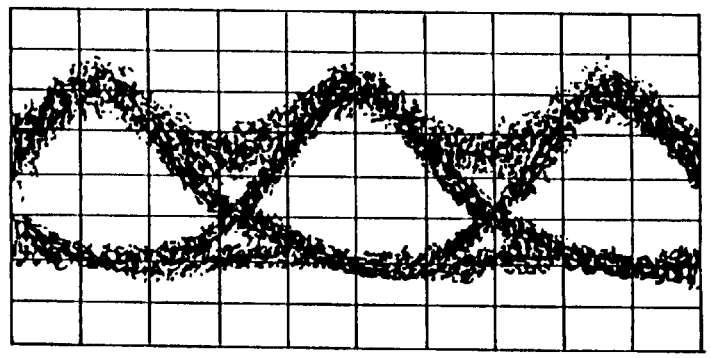
X-AXIS: 100 ps/div., Y-AXIS: 100 mV/div.
(b)
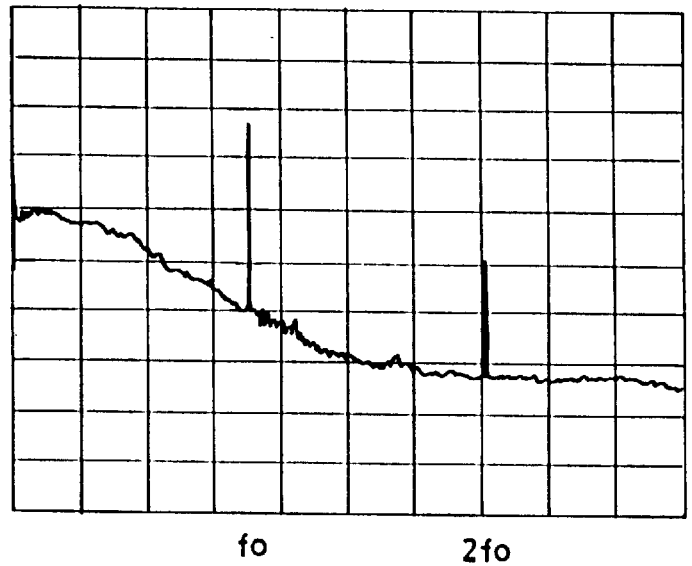
X-AXIS: CENTER 7.5GHz, SPAN 1.5 GHz/div., Y-AXIS: 10 dB/div.

OPTICAL COMMUNICATION SYSTEM AND OPTICAL RECEPTION APPARATUS USING SYNCHRONOUS POLARIZATION SCRAMBLER

BACKGROUND OF THE INVENTION

1. Field of the Invention

The present invention relates to an optical communication system and an optical reception apparatus using a synchronous polarization scrambler for scrambling the polarized state of a signal light according to a polarization modulation signal of a repetition frequency which coincides with the bit rate of the signal light.

2. Description of the Related Art

Heretofore, in optical transmission systems for long distances of over several thousands of kilometers and across the ocean, the optical signal has been converted to an electric signal, and transmitted using an optical regenerative repeater for retiming, reshaping and regenerating. Recently, however, optical amplifiers have been put to practical use, and an optical amplifier-repeated transmission method which uses an optical amplifier as a linear repeater has been studied. By substituting an optical regenerative repeater for an optical amplifying repeater, the number of parts in the repeater is greatly reduced, and the reliability is secured while the manufacturing cost can be greatly reduced.

In 1993, M. G. Taylor pointed out a phenomenon where noise light generated by a light repeating amplifier depends on the polarized state of a signal light, and the excessive noise light increases (polarization hole burning). Since due to the polarization hole burning, the mean value of the signal light to noise light ratio (optical SNR) decreases while the fluctuation of the optical SNR increases, this becomes a big problem in performing optical amplifier-repeated transmission.

As a measure against this, for example, polarization scrambling which can positively vary the polarized state of a signal light on the transmitting side has been proposed. FIG. 21 shows a schematic construction of a conventional optical communication system using polarization scrambler.

The conventional system shown in FIG. 21 comprises an optical transmitter 100 for sending a polarization-scrambled signal light to a transmission system 200, and an optical receiver 300 for receiving the signal light from the transmission system 200 and performing decision processing and the like. With the optical transmitter 100, a signal light having a predetermined bit rate which has been modulated according to the transmission data is projected from a signal light generator (E/O) 101, and the signal light is polarization-scrambled by a polarization scrambler (PS) 102 according to the polarization modulation signal and output to the transmission system 200. As a method for the polarization scrambling, there are, for example, a method using a phase modulator, a method for imparting a stress from a side of an optical fiber, and a method using two light sources. In the optical receiver 300, the signal light from the transmission system 200 is converted into an electric signal by a light receiving device (O/E) 301, and is subjected to the decision processing with a decision circuit (DEC) 302.

For example, in an experiment with a bit rate of 5.33 Gb/s and a transmission distance of 8100 km, in 1994, F. Heismann et al. attained a Q value improvement by 4 dB in 40 kHz and by 5 dB in 10.66 GHz for the repetition frequency in the polarized state, with a polarization scrambler using a phase modulator of lithium niobate (LiNbO$_3$) with a designated input polarized state of 45 degrees. The former repetition frequency is lower than the bit rate, and is referred to as low-speed polarization scrambling, while the latter is equal to or higher than the bit rate, and is therefore referred to as high-speed polarization scrambling. High-speed polarization scrambling has the effect of suppressing fluctuations in the optical SNR due to the polarization dependence loss of the optical transmission path and the optical amplifying repeater, and hence the improved amount thereof is large.

A polarization scrambler using a phase modulator will now be briefly described. The phase difference $\Delta\emptyset(t)$ of light in the TM mode and the TE mode generated by the phase modulator can be expressed by the following expression:

$$\Delta\emptyset(t)=\pi/\lambda[(ne^3\gamma_{33}-no^3\gamma_{13})V(t)L\Gamma]$$

where, $\lambda$ denotes the optical wavelength, $\gamma_{33}$ and $\gamma_{13}$ denote the electrooptical constant of the TM mode and the TE mode, ne and no denote the optical refractive index of the TM mode and the TE mode, V(t) denotes the applied voltage, L denotes the length of an electrode, and $\Gamma$ denotes a reduction coefficient of the applied voltage. By using this phase difference $\Delta\emptyset(t)$ of light in the TM mode and the TE mode, the polarization scrambler using the phase modulator can change the polarized state of the signal light.

Furthermore, as one method for realizing a large capacity of the optical transmission system, a wavelength division-multiplexing (WDM) optical transmission system is noted, which multiplexes and transmits light signals having two or more different wavelengths in a single optical transmission path.

With the WDM optical amplifier-repeated transmission method combining the WDM optical transmission method and the above-mentioned optical amplifier-repeated transmission method, it is possible to amplify light signals having two or more different wavelengths in the block using an optical amplifier, hence a large-capacity and long-distance transmission can be realized with a simple (economical) construction.

With the WDM optical amplifier-repeated transmission method, it is important to reduce the deterioration of the transmission characteristics due to the nonlinear effects of the optical transmission path. The incidence efficiency of, for example, the four-wave mixing (hereinafter referred to as "FWM") which is one of the nonlinear effects becomes maximum, when the polarized state of some signal lights coincide. Therefore, since it can be so set that the coincidence of the polarized state of some signal lights cannot be positively maintained by, for example, carrying out high-speed polarization scrambling, it is possible to reduce the incidence of the four-wave mixing.

As one example, the present inventors confirmed in 1996 in an experiment with four-wave multiplexing, a bit rate of 5.33 Gb/s, and a transmission distance of 4800 km, that by performing high-speed polarization scrambling in which the repetition frequency in the polarized state was twice as high as the bit rate, the incidence of the four-wave mixing was reduced thus improving the transmission characteristics. Furthermore, the WDM transmission method in which polarization scrambling is performed is described in detail in Japanese Unexamined Patent Publication No. 9-149006 which is the prior application of the present applicant.

Moreover, as one of the other important problems with the WDM optical amplifier-repeated transmission method, there can be mentioned the reduction of the channel interval, that is, the increase in the number of wavelength multiplexing. However since the signal light subjected to the high-speed polarization scrambling has an expanded spectrum, this becomes a hindrance when the high-density wavelength multiplexing is realized.

Therefore, N. S. Bergano et al. proposed in 1995 polarization scrambling in which the spectrum expansion in the signal light is relatively small and the repetition frequency is the same as the bit rate. Such polarization scrambling is referred to herein as synchronous polarization scrambling. In this proposal however, there is required a construction such that the intensity modulation and the polarization scrambling of a signal are synchronized in order to improve the transmission characteristics.

As the optical transmitter for performing the synchronous polarization scrambling, for example, there is a transmitter, as shown in FIG. 22, comprising a light source (LD) 101A for generating continuous light, an intensity modulator (IM) 101B for modulating the intensity of the light from the light source 101A, a first driving circuit (DRV) 101C for driving the intensity modulator 101B, a wave-shaping circuit 101D for synchronizing an input signal IN with an oscillation signal and sending the input signal to the first driving circuit 101C, a polarization scrambler (PS) 102A for polarization scrambling the signal light from the intensity modulator 101B, a second driving circuit (DRV) 102B for driving the polarization scrambler 102A, and a delay circuit 102C for sending the polarization-modulated signal in which the oscillation signal is delayed to the second driving circuit 102B.

The technology relating to the polarization scrambling as described above can be roughly divided into three according to the repetition frequency: a low-speed polarization scrambling, a synchronous polarization scrambling and a high-speed polarization scrambling. Here, the results of comparing and studying the characteristics when each polarization scrambling is performed, and when the polarization scrambling is not performed are shown in Table 1 below.

high-speed polarization scrambling is effective, as shown in Table 1. Furthermore, with synchronous polarization scrambling or high-speed polarization scrambling, though not an items of Table 1, it is possible to make the output higher by about 3 dB than with the low-speed polarization scrambling.

High-speed polarization scrambling is especially effective when the bit rate is about 2.5 Gb/s. When the bit rate becomes about 5 Gb/s or higher, however, the expansion of the spectrum in the signal light cannot be ignored, hence the wavelength dispersion tolerance becomes small. Moreover, it is necessary to have a wide channel interval. On the other hand, with synchronous polarization scrambling, since the expansion of the spectrum in the signal light is about half of that with high-speed polarization scrambling, the requirements of the wavelength dispersion tolerance and the channel interval can be alleviated.

Therefore, with high-speed optical communication systems having a bit rate of 5 Gb/s or higher, synchronous polarization scrambling is more effective.

With high-speed optical communication systems using synchronous polarization scrambling, however, when the signal light polarization-modulated by using the modulation signal in the repetition frequency which coincides with the bit rate (hereinafter, referred to as "polarization CLK frequency) is transmitted through the transmission path, an intensity modulation based on the Kerr effect due to the phase modulation component resulting from the polarization modulation thereof occurs, and the polarization CLK frequency is superimposed on the light emitting side of the waveform after the transmission. Furthermore, due to polarization dependence loss (PDL) of the optical transmission path, the optical amplifying repeater or the like, there is the possibility that the polarization modulation component is converted to intensity noise thus increasing the Q value fluctuation.

The results of transmission experiments performed under the condition of, for example, a bit rate of 5.3 Gb/s, eight

TABLE 1

| | Polarization Scrambling | | | |
|---|---|---|---|---|
| Item | None | Low speed | Synchronous | High speed |
| Repetition frequency | — | approx. 100 kHz | Br | approx. 2 Br |
| PDG fluctuation | X increased | ○ suppressed | ○ suppressed | ○ suppressed |
| PDL fluctuation | Δ increased | Δ increased | Δ suppressed | ○ suppressed |
| FWM incidence | X increased | X increased | ○ suppressed | ○ suppressed |
| Wavelength dispersion tolerance | ○ large | ○ large | Δ fairly small | X small |
| Channel interval | ○ narrow | ○ narrow | Δ fairly wide | X wide |
| Intensity modulation noise | ○ none | X yes | X yes | ○ none |

In Table 1, Br denotes oscillation frequency used for the bit rate,
PDG denotes polarization dependence gain, and
PDL denotes polarization dependence loss.

In Table 1, Br denotes oscillation frequency used for the bit rate, PDG denotes polarization dependence gain, and PDL denotes polarization dependence loss.

One of the important requirement items for putting a large-capacity and long-distance transmission system into practical use is a reduction of the number of optical amplifying repeaters by extending the interval between repeaters. For that purpose, it is necessary to reduce the incidence efficiency of FWM and to realize a high-output optical amplifying repeater. As a method to reduce the incidence efficiency of FWM, synchronous polarization scrambling or wavelength multiplexing, and a transmission distance of 2679 km are shown in FIG. 23~FIG. 25. FIGS. 23(a) and (b) show the reshaped waveform and the electric spectrum of the signal light transmitted from the optical transmitter (signal light before transmission subjected to synchronous polarization scrambling), and FIGS. 24(a) and (b) show the reshaped waveform and the electric spectrum of the signal light received by the optical receiver (signal light after transmission). In addition, FIGS. 25(a) and (b) show the reshaped waveform and the electric spectrum after the received signal is passed through an equalizing filter.

First with regard to the change before and after transmission, the reshaped waveform before transmission in FIG. 23(a) is approximately vertically symmetrical, but it is seen that the reshaped waveform after transmission shown in FIG. 24(a) is not vertically symmetrical, because the polarization CLK frequency component is superimposed on the light emitting side (upper side in the figure). Moreover, with regard to each electric spectrum in FIG. 23(b) and FIG. 24(b), it is seen that the power of the polarization CLK frequency fo component before and after the transmission increases to about 16 dB (about forty times).

The change in the signal light before and after transmission can be considered to results from the Kerr effect due to the phase modulation as described above, and results from the polarization dependence loss. With regard to the former case, since the correlation of the phase modulation and the intensity modulation is strong, if the state of the transmission data is reconciled with the polarized state (phase) modulation, it is possible to obtain a waveform having a large opening portion as shown in FIG. 24(a). With regard to the latter case, however, since the change in the signal light occurs depending upon the state of the optical transmission path, it is difficult to control the occurrence.

Furthermore, the spectral component in the vicinity of the polarization CLK frequency fo is within a range of the polarization CLK frequency fo ±50 Hz, since the polarization CLK frequency fo is slightly modulated due to the polarization fluctuation (the major frequency component is about 50 Hz or below) in the optical transmission path. Accordingly, the peak of the polarization CLK frequency fo in FIG. 24(b) has a range of about 100 Hz. In addition, the peak on the right hand side in FIG. 23(b) and FIG. 24(b) is a harmonic component twice as high as the polarization CLK frequency.

As described above, when the synchronously polarization-scrambled signal light is transmitted, the signal light affected by the polarization modulation is received by the optical receiver. The optical receiver then converts the received signal light to an electric signal, and extracts only a necessary frequency component through the equalizing filter to perform decision processing and the like. In general, as the equalizing filter used for the optical receiver, a Bessel-type filter or the like excellent in the group delay characteristic is used, and the cutoff frequency is set to be around 0.6 to 0.8 times as high as the bit rate, when an NRZ code or the like is used. With such an equalizing filter, when the synchronous polarization scrambling is performed, the frequency component of the bit rate, that is, the polarization CLK frequency fo component cannot be sufficiently cut off.

In the above-mentioned transmission experiment, when, for example, an equalizing filter having a cutoff frequency of 4.0 GHz is used with respect to the bit rate of 5.3 Gb/s, as shown in FIGS. 25(a) and (b), the reshaped waveform remains vertically asymmetric, and it is seen that the amount of attenuation of the polarization CLK frequency fo component is only about 6 dB compared to that for before passing through the equalizing filter.

When such a signal is sent to the decision circuit, there is a possibility that the reception characteristic is deteriorated due to the influence of the polarization CLK frequency fo component, which is a problem.

SUMMARY OF THE INVENTION

In view of the above problems, it is an object of the present invention to provide an optical communication system and an optical reception apparatus which can reduce the noise component generated when a synchronously polarization-scrambled signal light is transmitted.

The technique for suppressing an unnecessary component for the low-speed polarization scrambling has been proposed in Japanese Unexamined Patent Publication No. 9-8742 being the prior application of the present applicant. However the present invention is intended for synchronous polarization scrambling and has a different construction.

Therefore, the optical reception apparatus of the present invention is an optical reception apparatus for receiving and processing a synchronously polarization-scrambled signal light via an optical transmission device, using a synchronous polarization scrambler which scrambles the polarized state of the signal light in accordance with a polarization modulation signal of a repetition frequency which coincides with the bit rate, and comprises a noise reducing section for reducing only a noise component generated based on the synchronous polarization scrambling performed with respect to at least one of, the signal light before photoelectric conversion and an electric signal after photoelectric conversion.

With such a construction, when the synchronously polarization-scrambled signal light is transmitted to the optical reception apparatus via the optical transmission device, noise resulting from the polarization modulation is generated because of the transmission of the synchronously polarization-scrambled signal light through the optical transmission device. The optical reception apparatus receives the signal light containing such a noise component, but only the above-mentioned noise component is reduced by sending the received signal light or the photoelectrically converted electric signal to the noise reducing section. Thus, by performing the reception processing using a signal in which the noise is reduced, excellent reception characteristics can be obtained.

As a specific example of a noise reducing section for reducing the noise component contained in the received signal, in the electric signal stage, a band reject filter having a rejection bandwidth centered on the repetition frequency may be used. With this band reject filter, it is desirable that the amount of attenuation of the noise component in the rejection bandwidth be not less than 3 dB, and it is preferable that the rejection bandwidth be not less than 100 Hz. Moreover, the group delay amount in a range of from DC to 0.8 times the frequency fo is desirably not higher than 10% of the period for one bit given from the bit rate.

Furthermore as another specific example of a noise reducing section for reducing the noise component, in the electric signal stage, a low-pass filter which intercepts noise components equal to or higher than the repetition frequency may be used. With the low-pass filter, it is desirable that the amount of attenuation of noise components equal to or higher than the repetition frequency be not less than 3 dB, and it is preferable that the group delay amount in a range of from DC to 0.8 times the frequency fo be not higher than 10% of the period for one bit given from the bit rate.

On the other hand, as a specific example of a noise reducing section in which the noise component contained in the received signal is reduced in the light signal stage, a light reducing filter having a narrow bandwidth capable of intercepting the noise component affected by the repetition frequency may be used. It is desirable that this light reducing filter have a bandwidth of which center frequency corresponds to the frequency of the signal light and which is narrower than twice the width of the repetition frequency.

By constituting the noise reducing section as described above, it is possible to reliably reduce the noise component contained in the received signal light or the electric signal to which the signal light is photoelectrically converted. Naturally, a construction for reducing the noise component for both the signal light and the photoelectrically converted electric signal is also possible.

Furthermore, the noise reducing section using the light reducing filter may include a light reducing filter control section which directs the center frequency in the bandwidth of the light reducing filter to follow the frequency of the signal light.

By providing the light reducing filter control section, then even if the frequency of the signal light fluctuates, the center frequency of the bandwidth of the light reducing filter follows the fluctuation, and hence even a light reducing filter having a narrow bandwidth can reliably intercept the noise component.

The light receiving apparatus described above may include a signal extraction section for extracting a signal of the repetition frequency component, in the stage prior to the noise reducing section, to output the signal extracted by the signal extraction section as a monitoring signal for monitoring the polarization dependence of the optical transmission device. As the signal extraction section, a circulator for extracting the noise component intercepted and reflected by the noise reducing section may be used. In addition, the signal extraction section may include a branching section for branching a part of the input signal to be sent to the noise reducing section, and a band-pass filter for passing only the component of the repetition frequency and the component in the vicinity thereof among the signals branched by the branching section.

With such a construction, the signal of the repetition frequency component contained in the received signal is extracted by the signal extraction section. The signal of the repetition frequency component is a signal reflecting the polarization dependence of the light transmitting device. Accordingly, it becomes possible to monitor the polarization dependence of the optical transmission device by designating the extracted signal as the monitoring signal, and by analyzing the monitoring signal, for example, in the time domain or in the frequency domain.

Furthermore, the optical reception apparatus including the signal extraction section may include a clock generating section for generating a clock signal for the reception processing, using the signal extracted by the signal extraction section.

The signal extracted by the signal extraction section has a repetition frequency which coincides with the bit rate, hence it can be used as the clock signal used for the reception processing. As described above, if the clock generating section is provided to generate the clock signal from the extracted signal, the clock signal for the reception processing which has heretofore been obtained by retiming the data signal can be easily obtained.

The optical communication system using the synchronous polarization scrambler of the present invention is an optical communication system which comprises a light transmitting device, including a synchronous polarization scrambler, for scrambling the polarized state of a signal light according to the polarization modulation signal of the repetition frequency which coincides with the bit rate for transmitting the synchronously polarization-scrambled signal light to an optical transmission device, and a light receiving device for receiving and processing the signal light transmitted from the light transmitting device via the optical transmission device, wherein the light receiving device includes a noise reducing section for reducing only the noise component generated based on the synchronous polarization scrambling performed with respect to at least one of the signal light before the photoelectric conversion and the electric signal after the photoelectric conversion.

With such a construction, the synchronously polarization-scrambled signal light is transmitted from the light transmitting device to the light receiving device via the optical transmission device. At this time, since the synchronously polarization-scrambled signal light is transmitted via the optical transmission device, noise resulting from the polarization modulation is generated. The light receiving device receives the signal light containing such a noise component, but only the above-mentioned noise component is reduced by sending the received signal light or the photoelectrically converted electric signal to the noise reducing section. Thus, by performing the reception processing using a signal in which the noise is reduced, excellent reception characteristics can be obtained.

Furthermore, with the above-mentioned optical communication system the construction may be such that the light transmitting device includes a monitoring control signal superposing section which superimposes a monitoring control signal showing the state of the optical transmission device on the polarization modulation signal, and the light receiving device includes; a signal extraction section for extracting a signal of the repetition frequency component in the stage prior to the noise reducing section, and a monitoring control signal demodulating section for demodulating the monitoring control signal based on the signal extracted by the signal extraction section.

With such a construction, the signal light synchronously polarization-scrambled by the polarization modulation signal on which the monitoring control signal is superimposed is transmitted via the optical transmission device to the light receiving device, and the signal of the repetition frequency component is taken out by the signal extraction section in the light receiving device. The signal of the repetition frequency component becomes a signal on which the monitoring control signal is superimposed as well as the polarization modulation signal. Hence by demodulating the monitoring control signal with the monitoring control signal demodulating section, the transmission of the monitoring control signal becomes possible between the light transmitting device and the light receiving device.

Other objects, characteristics and advantages of the present invention will become apparent from the following description of preferred embodiments given in conjunction with the appended drawings.

BRIEF DESCRIPTION OF THE DRAWINGS

FIG. 4 is a diagram showing the signal waveform and the electric spectrum after passing through the band reject filter and an equalizing filter in the first embodiment of FIG. 1;

FIG. 23 is a diagram showing the reshaped waveform and the electric spectrum of a synchronously polarization-scrambled signal light at the output end of the optical transmitter;

FIG. 24 is a diagram showing the reshaped waveform and the electric spectrum of a synchronously polarization-scrambled signal light at the input end of the optical transmitter; and FIG. 25 is a diagram showing the reshaped waveform and the electric spectrum of a synchronously polarization-scrambled signal light after passing through the equalizing filter.

DESCRIPTION OF THE PREFERRED EMBODIMENTS

Embodiments of the present invention will now be described with reference to the drawings.

Figure 1:
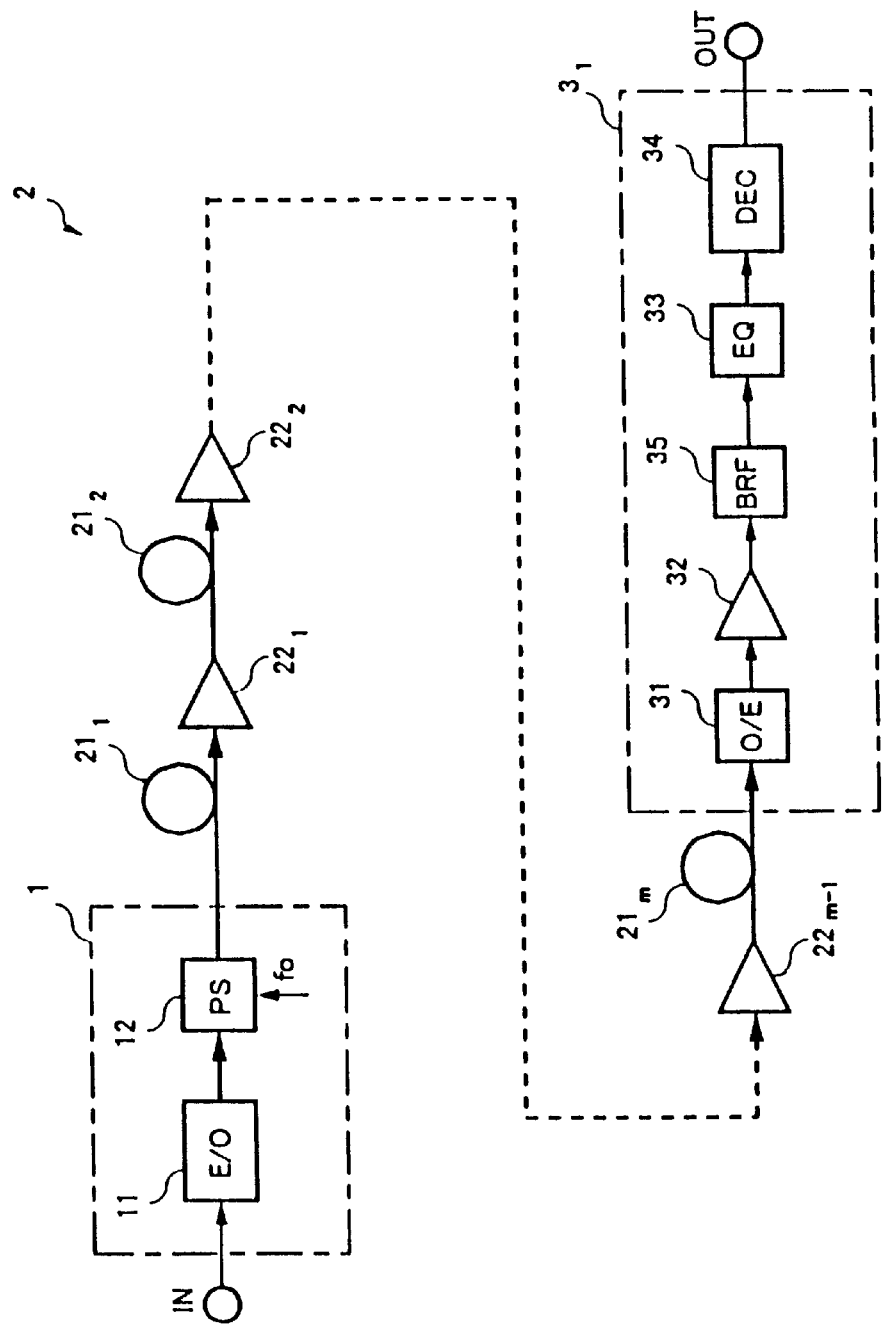
FIG. 1 is a block diagram showing the construction of a first embodiment of the present invention.

FIG. 1 is a block diagram showing the construction of an optical communication system using a synchronous polarization scrambler, according to a first embodiment.

In FIG. 1, the optical communication system comprises an optical transmitter 1 as a light transmitting device for transmitting synchronously polarization-scrambled signal light, a transmission system 2 as an optical transmission device for transmitting the signal light from the optical transmitter 1, and an optical receiver $3_1$ as a light receiving apparatus or light receiving device for receiving the signal light from the transmission system 2 and performing decision processing and the like.

Figure 22:
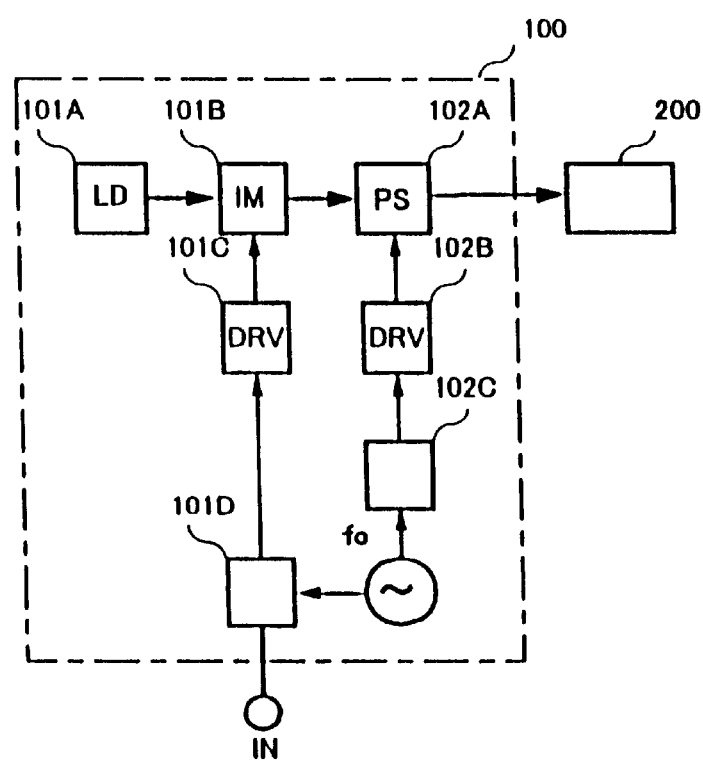
FIG. 22 is a block diagram showing an example of the construction of a conventional optical transmitter which performs intensity modulation and polarization scrambling of the signal light synchronously.

The optical transmitter 1 comprises, as in the conventional construction, a signal light generator (E/O) 11 and a polarization scrambler (PS) 12, for example. The signal light generator 11 projects a signal light modulated according to transmission data IN applied from outside. The polarization scrambler 12 synchronously polarization-scrambles the signal light to be transmitted to the transmission system 2, by phase-modulating the signal light according to a modulation signal of a repetition frequency (polarization CLK frequency fo) the same as the bit rate of the signal light from the signal light generator 11. In addition, with regard to the specific construction of the optical transmitter 1, the construction shown in the above-mentioned FIG. 22 which synchronizes the intensity modulation and the polarization scrambling of the signal light can be applied.

The transmission system 2 comprises, for example, optical transmission paths of m, $21_1 \sim 21_m$ and optical amplifiers $22_1 \sim 22_{m-1}$ inserted between each optical transmission path $21_1 \sim 21_m$. The optical transmission path $21_1$ is connected to the output terminal of the optical transmitter 1 at one end, and connected to the input terminal of the optical amplifier $22_1$ at the other end. To the output terminal of the optical amplifier $22_1$ is connected one end of the optical transmission path $21_2$. Each optical transmission path is then connected via the optical amplifier, respectively in the same manner, and the terminator of the optical transmission path $21_m$ is connected to the input terminal of the optical receiver $3_1$. Incidentally, the construction of the transmission system 2 is herein an optical amplifier-repeated transmission method, but it is not limited thereto and may be constructed only with the optical transmission path.

The optical receiver $3_1$ comprises a band reject filter (BRF) 35, for example, between the amplifier 32 and the equalizing filter 33, in addition to the construction similar to the conventional construction, i.e., a light receiving device (O/E) 31, an amplifier 32, an equalizing filter (EQ) 33, and a decision circuit (DEC) 34. As the light receiving device 31, a photodiode or the like for receiving the signal light sent from the optical transmission path $21_m$ and converting it to the electric signal is used. The amplifier 32 is an electric amplifier having a sufficient band which amplifies the electric signal converted by the light receiving device 31 to a required level.

The band reject filter 35 is an electric filter which removes only the component of the polarization CLK frequency fo and the component in the vicinity thereof contained in the signal amplified by the amplifier 32.

Figure 2:
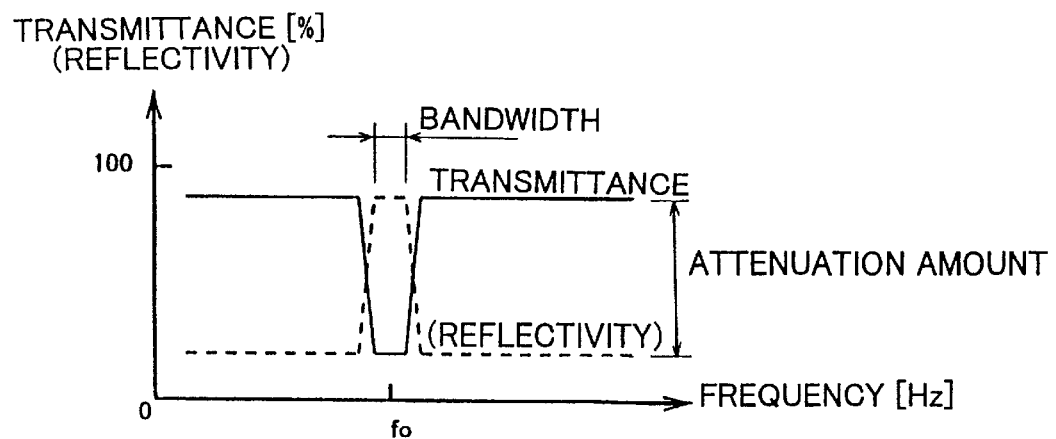
FIG. 2 is a diagram showing the transmission (reflection) characteristic of a band reject filter in the first embodiment of FIG. 1.
Figure 3:
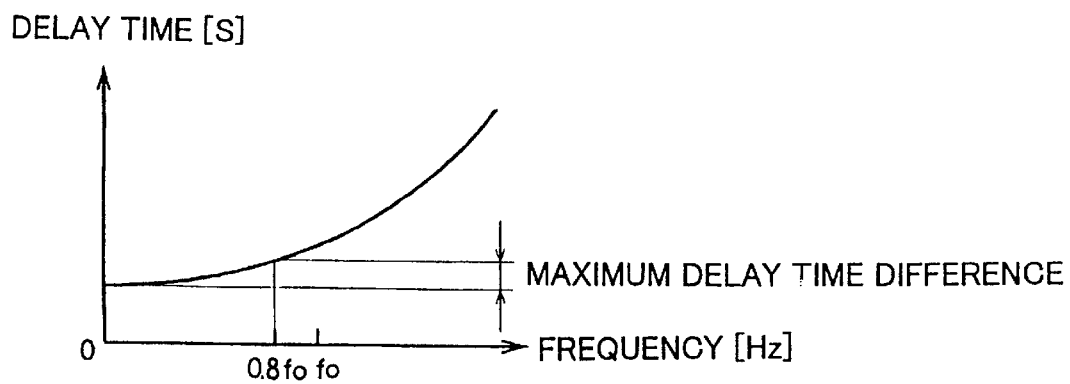
FIG. 3 is a diagram showing the delay characteristic of the band reject filter in the first embodiment of FIG. 1.

FIG. 2 shows one example of the transmission (reflection) characteristic of the band reject filter 35. FIG. 3 also shows one example of the delay characteristic of the band reject filter 35.

As shown in FIG. 2, the band reject filter 35 has a characteristic to intercept only the frequency component of the rejection bandwidth centered on the polarization CLK frequency fo, and to transmit the frequency component other than the above-mentioned component. The rejection bandwidth is preferably set to be about 100 Hz or higher, since the spectral component in the vicinity of the polarization CLK frequency fo contained in the received signal, as described above, is within the range of fo ±50 Hz (because the polarization CLK frequency fo is modulated due to the polarization fluctuation of the optical transmission path). By setting the rejection bandwidth in the above-mentioned range, the signal within the above-mentioned range can be reliably intercepted. Moreover, the amount of attenuation of the intercepted frequency component is desirably at least about 3 dB in order to reduce the polarization CLK frequency fo to a level which does not affect the reception characteristic. In addition, it is necessary that the band reject filter 35 has an excellent delay characteristic. For example, as shown in FIG. 3, it is preferable to use a band reject filter 35 having such a delay characteristic that the maximum delay time difference (group delay amount) is not higher than about 10% of the period for one bit_given from the bit rate, in a range of from DC to 0.8 times the frequency fo (the frequency band necessary for discriminating the transmission data).

The equalizing filter 33 is an electric filter for extracting the frequency component necessary for discriminating the transmission data from the signal passed through the band reject filter 35. As the equalizing filter 33, for example, a Bessel type filter or the like is used herein to set the intercepted frequency to 0.6~0.8 times the bit rate. The decision circuit 34 regenerates the clock signal based on the signal passed through the equalizing filter 33, performs the data decision processing of the received signal according to the clock signal, and outputs the result to the terminal OUT.

The operation of the first embodiment will now be described.

First with the optical transmitter 1, the signal light modulated according to the transmission data IN is sent from the signal light generator 11 to the polarization scrambler 12 to be synchronously polarization-scrambled, and then transmitted to the transmission system 2. The reshaped waveform and the electric spectrum of the signal light transmitted from this optical transmitter 1 are similar to those shown in the above-mentioned FIG. 23.

The signal light from the optical transmitter 1 then passes through each optical transmission path $21_1 \sim 21_m$ and each optical amplifier $22_1 \sim 22_{m-1}$ in the transmission system 2 in sequence, and reaches the input end of the optical receiver $3_1$. At this time, the synchronously polarization-scrambled signal light is affected by the Kerr effect due to the phase modulation, the polarization dependence loss of the transmission system 2 or the like. The reshaped waveform and electric spectrum of the signal light after the transmission are similar to those shown in the above-mentioned FIG. 24.

The signal light reaching the optical receiver $3_1$ is converted to the electric signal by the light receiving device 31, and amplified by the amplifier 32. The signal output from the amplifier 32 will have significant power at the polarization CLK frequency fo and in the vicinity thereof.

When this signal is input to the band reject filter 35, the component of the polarization CLK frequency fo and the components in the vicinity thereof are mostly stopped by the band reject filter 35 while the other frequency components are transferred to the equalizing filter 33. With the equalizing filter 33, the high frequency components not necessary for the decision of the transmission data are then removed.

FIG. 4 shows one example of the signal waveform and the electric spectrum output from the equalizing filter 33 via the band reject filter 35.

The waveform in FIG. 4(*a*) becomes a roughly vertically symmetrical waveform without superimposition of the polarization CLK frequency fo component on the light emitting side. Furthermore, in the electric spectrum in FIG. 4(*b*), the power of the polarization CLK frequency fo component greatly decreases. As compared with the electric spectrum shown in FIG. 25(*b*) described above, it is seen that the power of the polarization CLK frequency fo component is attenuated to about 25 dB (about 1/300), by inserting the band reject filter 35.

The signal output from the equalizing filter 33 is then sent to the decision circuit 34, and processing such as regeneration of the clock signal and decision of the received signal and the like are performed based on this signal.

According to the first embodiment, by providing the band reject filter 35 in the optical receiver $3_1$, only the component of the polarization CLK frequency fo and the component in the vicinity thereof can be reliably reduced. Hence the deterioration of the reception characteristic can be prevented when the signal light is subjected to the synchronous polarization scrambling and then transmitted.

A second embodiment of the present invention will now be described.

Figure 5:
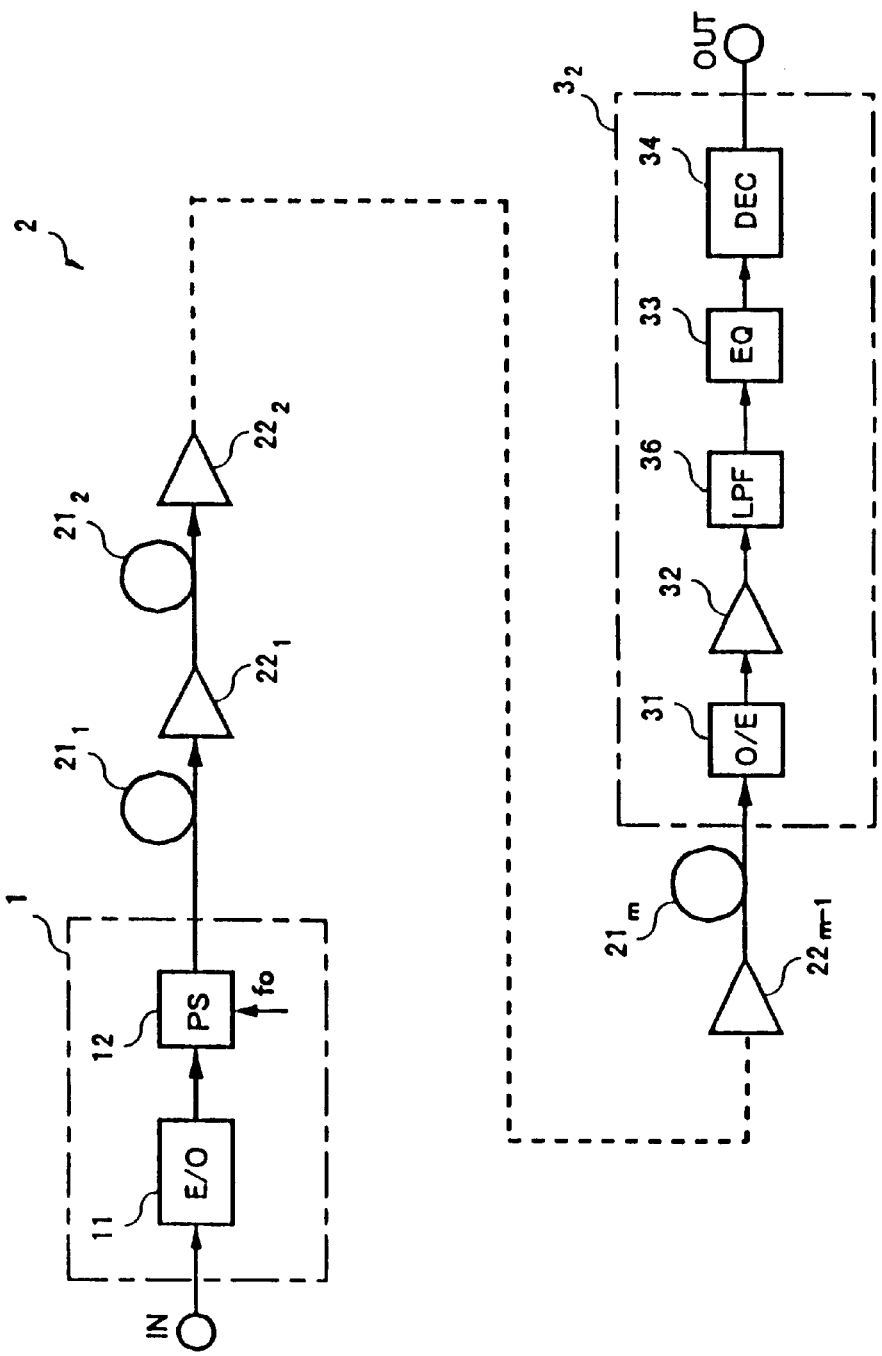
FIG. 5 is a block diagram showing the construction of a second embodiment of the present invention.

FIG. 5 is a block diagram showing the construction of an optical communication system using synchronous polarization scrambling according to the second embodiment. The same reference numerals are given to parts similar to those of the first embodiment, and description thereof is omitted. The same applies for the subsequent embodiments.

In FIG. 5, the optical transmission system of this embodiment comprises a low-pass filter (LPF) 36 instead of and in the same position as the band reject filter 35 provided in the optical receiver $3_1$ in the first embodiment. Other construction is the same as in the first embodiment.

Figure 6:
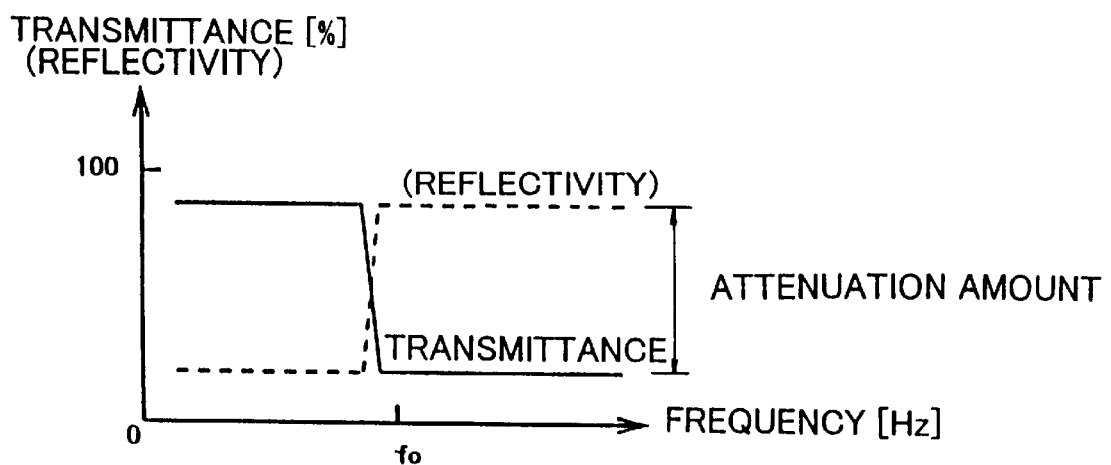
FIG. 6 is a diagram showing the transmission (reflection) characteristic of a low-pass filter in the second embodiment of FIG. 5.

The low-pass filter 36 is an electric filter which intercepts the high frequency component containing the polarization CLK frequency fo. In FIG. 6, one example of the transmission (reflection) characteristic of the low-pass filter 36 is shown. The amount of attenuation of the intercepted frequency component is desirably at least about 3 dB, in order to reduce the polarization CLK frequency fo component to a level which does not affect the reception characteristic. Moreover, this low-pass filter 36 has an excellent delay characteristic as with the band reject filter 35 shown in FIG. 3 described above. As a specific example of the low-pass filter 36, a Butterworth filter, a Chebyshev filter and the like are preferable.

As described above, with the second embodiment, even when a low-pass filter 36 is provided in an optical receiver $3_2$, the component of the polarization CLK frequency fo and the component in the vicinity thereof can be sufficiently reduced, and the deterioration of the reception characteristic can be prevented when the signal light is subjected to the synchronous polarization scrambling and then transmitted, as in the first embodiment.

In the first and the second embodiments, the band reject filter 35 or the low-pass filter 36 is arranged between the amplifier 32 and the equalizing filter 33. However these filters may be provided in a suitable position between the light receiving device 31 and the decision circuit 34.

A third embodiment of the present invention will now described.

Figure 7:
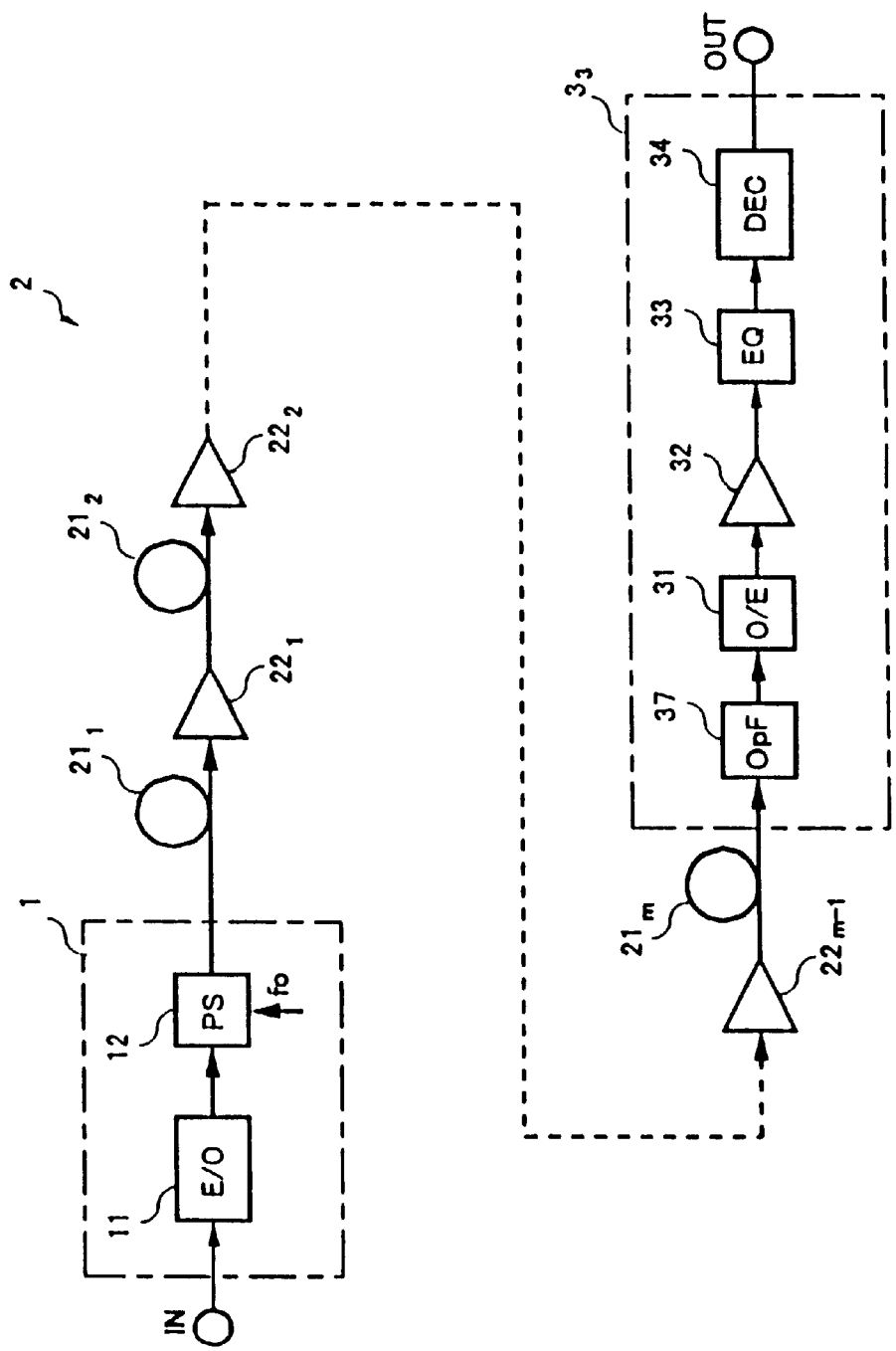
FIG. 7 is a block diagram showing the construction of a third embodiment of the present invention.

FIG. 7 is a block diagram showing the construction of an optical transmission system using a synchronous polarization scrambler according to the third embodiment.

In FIG. 7, the optical transmission system of this embodiment comprises a light reducing filter (OpF) 37 instead of the band reject filter 35 provided in the optical receiver $3_1$ in the first embodiment and in the stage prior to the light receiving device 31. Other construction is the same as in the first embodiment.

Figure 8:
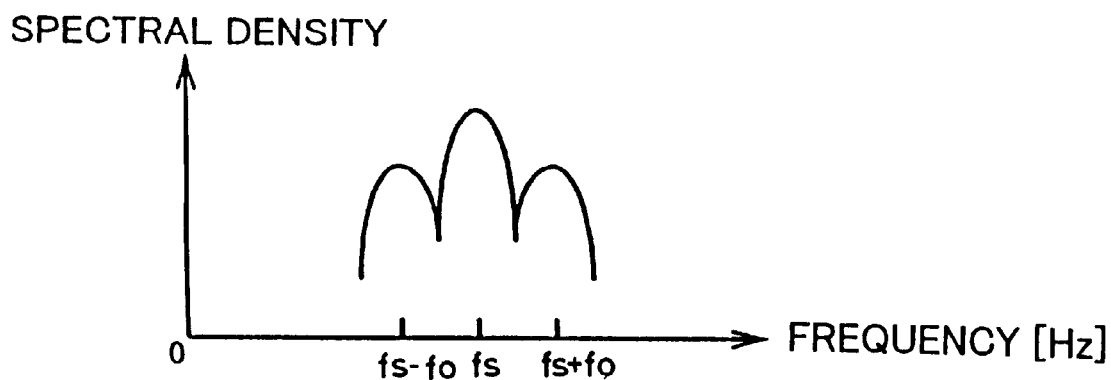
FIG. 8 is a diagram showing an optical spectrum of the received light signal in the third embodiment of FIG. 7.

The light reducing filter 37 is connected between the terminator of the optical transmission path $21_m$ and the input end of the light receiving device 31, to remove the light affected by the polarization CLK frequency fo component contained in the signal light from the transmission system 2. As shown in the spectrum example of FIG. 8, the synchronously polarization-scrambled signal light reaching an optical receiver $3_3$ has a peak at which the spectral density becomes the maximum centered on the frequency fs (=speed of light/wavelength) of the signal light, and there are portions where the spectral density is high centered on the light frequency fs−fo, and fs+fo, respectively, with respect to the frequency fs. The light reducing filter 37 inputs the signal light in the spectral state described above, transmits only the light centered on the light frequency fs, and intercepts the light centered on the light frequency fs−fo and fs+fo, respectively.

Figure 9:
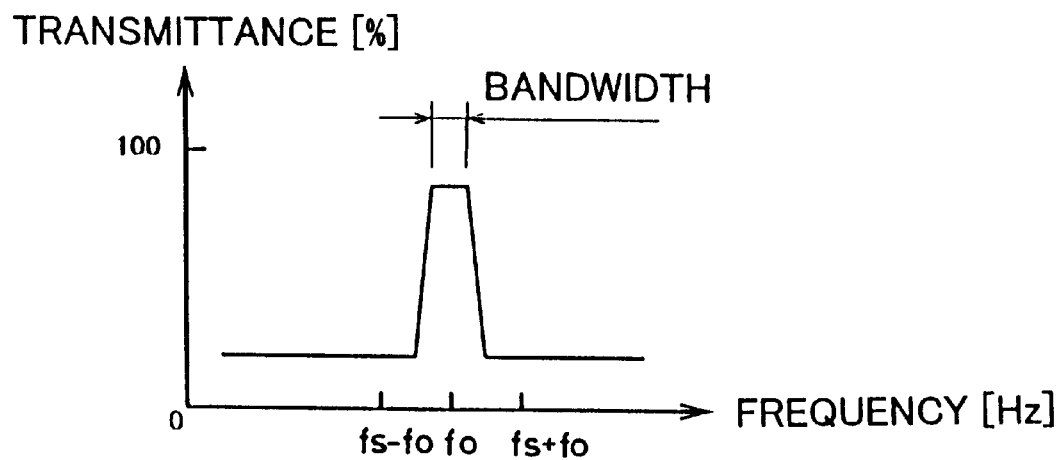
FIG. 9 is a diagram showing the transmission characteristic of a light reducing filter in the third embodiment of FIG. 7.

FIG. 9 shows one example of the transmission characteristic of such a light reducing filter 37.

As shown in FIG. 9, the transmittance of the light reducing filter 37 is such that it becomes high only in a sufficiently narrow band centered on the light frequency fs, and low in other frequency bands. Specifically, this is preferably set so that the bandwidth having a high transmittance becomes narrower than twice the polarization CLK frequency fo.

With regard to the operation of the optical communication system having such a construction, when the synchronously polarization-scrambled signal light is transmitted to the optical receiver $3_3$ via the transmission system 2 from the optical transmitter 1, as in the operation of the first and second embodiments, the signal light is input to the light reducing filter 37, so that only the signal light component of the light frequency fs and the component in the vicinity thereof pass through the light reducing filter 37 and are sent to the light receiving device 31, and other signal light components are intercepted by the light reducing filter 37. As a result there is practically no processing of the signal light components affected by the polarization CLK frequency fo component after the light receiving device 31. Hence, the signal input to the decision circuit 34 becomes a signal in which the component of the polarization CLK frequency fo and the component in the vicinity thereof are sufficiently reduced, as shown in FIG. 4 described above.

In the above manner, according to the third embodiment, by providing a light reducing filter 37 which transmits only the signal light having a sufficiently narrow bandwidth centered on the frequency fs of the signal light at the input end of the optical receiver $3_3$, the deterioration of the reception characteristic can be prevented when the signal light is synchronously polarization-scrambled and transmitted.

A fourth embodiment of the present invention will now described.

In the fourth embodiment, a function that the center frequency of the transmission band of the light reducing filter 37 follows the fluctuation of the frequency fs of the signal light is added to the construction in the third embodiment.

Figure 10:
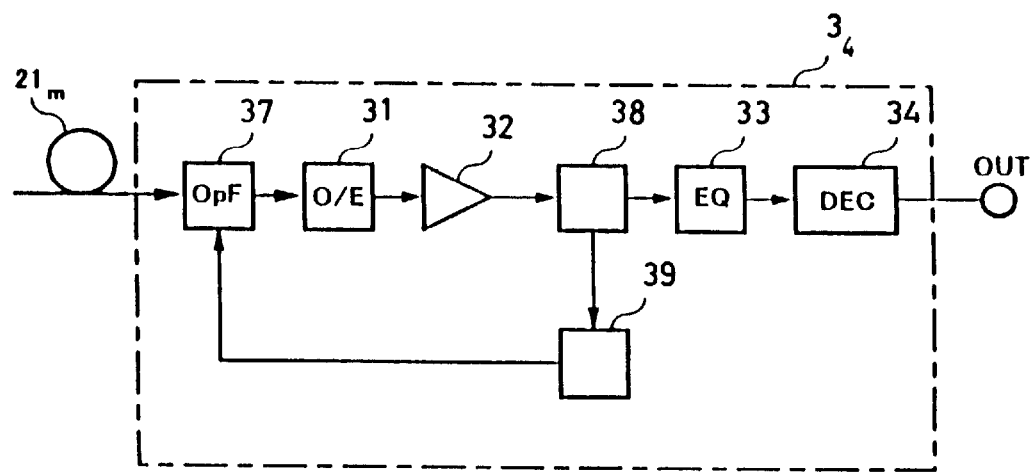
FIG. 10 is a block diagram showing the construction of an optical receiver in a fourth embodiment of the present invention.

FIG. 10 shows the construction of the optical receiver in the fourth embodiment.

In FIG. 10, the construction of an optical receiver $3_4$ is such that an electric branching circuit 38 is inserted between the amplifier 32 and the equalizing filter 33, and a light reducing filter control circuit 39 is provided for controlling the center frequency of the transmission band of a light reducing filter 37' based on the signal branched by this electric branching circuit 38. Moreover, as the light reducing filter 37', one wherein the center frequency of the transmission band is variable is used. Here, the electric branching circuit 38 and the light reducing filter control circuit 39 function as the light reducing filter control section.

In general, with the signal light transmitted through the transmission system 2, the frequency (wavelength) thereof may change slightly. Moreover, the transmission center frequency of the light reducing filter fluctuates due to its having temperature dependency or the like. Since the bandwidth of the light reducing filter is very narrow, as described above, if the frequency fs of the signal light and the transmission center frequency of the light reducing filter change, then in some cases, the light frequency fs−fo or fs+fo affected by the polarization CLK frequency fo may be transmitted through the light reducing filter.

In this embodiment, therefore, while the transmission center frequency of the light reducing filter 37' is variable, a part of the signal transmitted through the light reducing filter 37' and passed through the light receiving device 31 and the amplifier 32 is taken out by the electric branching circuit 38, and the frequency fs of the signal light is determined based on the signal, by the light reducing filter control circuit 39 to feed it back to the light reducing filter 37'. Thereby, it is so controlled that the transmission center frequency of the light reducing filter 37' follows the change in the frequency fs of the signal light. Hence only the frequency fs of the signal light is stably transmitted to the light receiving device 31.

Thus, in the fourth embodiment, the transmission center frequency of the light reducing filter 37' has a function to follow the frequency fs of the signal light. Hence the component of the signal light affected by the polarization CLK frequency fo component can be reliably reduced by the light reducing filter 37'.

A fifth embodiment of the present invention will now described.

In the fifth embodiment, a description will be given of another example of a construction wherein the center frequency of the transmission band of the light reducing filter 37 follows the fluctuation of the frequency fs of the signal light.

Figure 11:
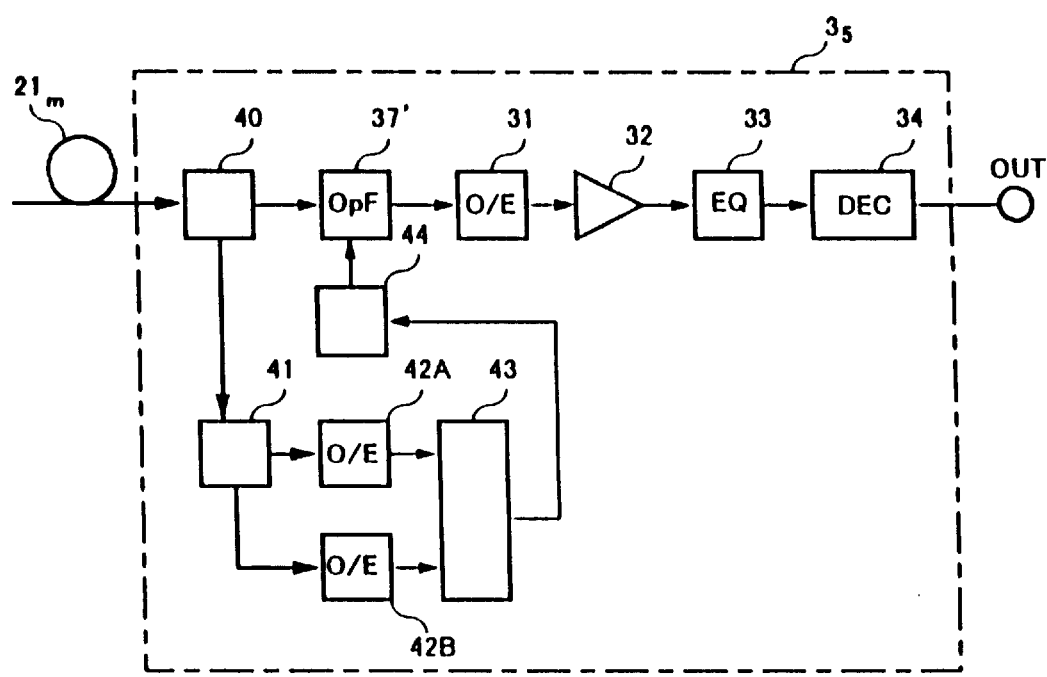
FIG. 11 is a block diagram showing the construction of an optical receiver in a fifth embodiment of the present invention.

FIG. 11 is a block diagram showing the construction of an optical receiver in this embodiment.

The construction of the optical receiver $3_5$ shown in FIG. 11 includes an optical circulator 40 provided in the stage prior to the light reducing filter 37' in which the center frequency of the transmission band is variable, an optical wave-dividing device 41 for dividing the signal light taken out by the optical circulator 40 into two signal lights according to the light frequency, light receiving devices 42A and 42B for respectively converting each divided signal light into the electric signal, a comparator 43 for comparing the electric signals from respective light receiving devices 42A and 42B, and a control circuit 44 for controlling the transmission center frequency of the light reducing filter 37' based on the results of the comparator 43. Here, these respective constructions function as the light reducing filter control section. The construction of the optical receiver $3_5$ other than as described above is similar to that of the optical receiver $3_3$ in the third embodiment.

Figure 12:
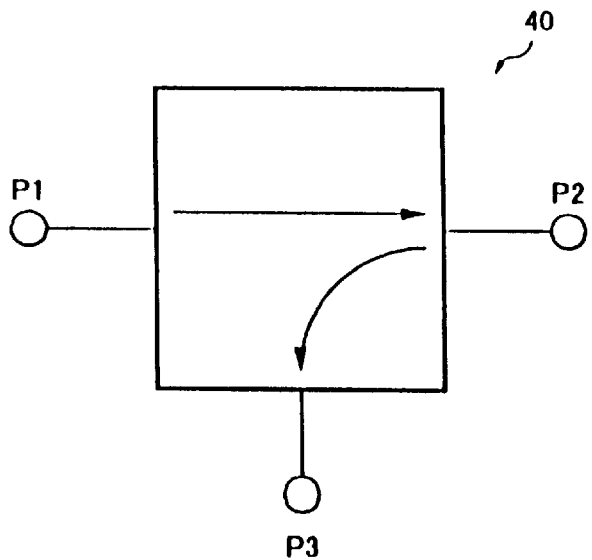
FIG. 12 is a diagram showing the terminal construction of an optical circulator used for the fifth embodiment of FIG. 11.

The optical circulator 40 has, as shown in FIG. 12, three terminals P1, P2 and P3. The terminal P1 is connected to the terminator of the optical transmission path $21_m$, the terminal P2 is connected to the input terminal of the light reducing filter 37', and the terminal P3 is connected to the input terminal of the optical wave-dividing device 41. Between each terminal P1~P3, the signal light is transmitted only in the direction from the terminal P1 to the terminal P2, and in the direction from the terminal P2 to the terminal P3, and not in the other directions.

Figure 13:
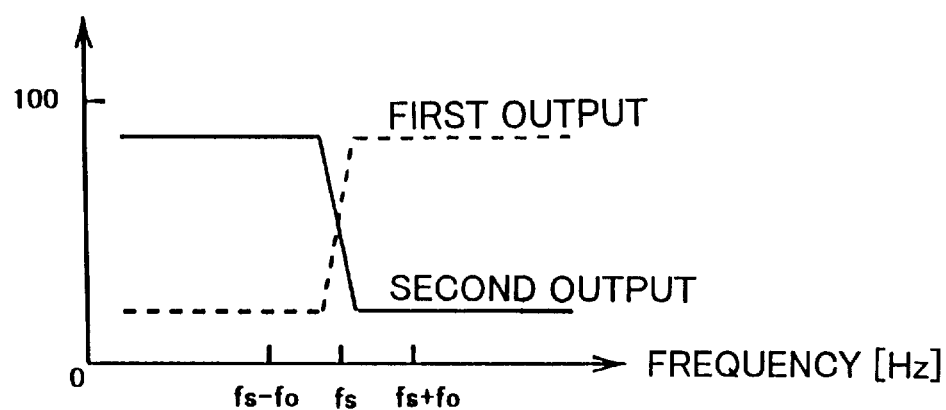
FIG. 13 is a diagram showing the transmission characteristic of an optical wave-dividing device used for the fifth embodiment of FIG. 11.

As shown in the transmission characteristic of FIG. 13, among the signal lights from the terminal P3 of the optical circulator 40, the optical wave-dividing device 41 sends the component whose light frequency is higher than the light frequency fs to the light receiving device 42A as a first output light, and sends the component whose light frequency is lower than the light frequency fs to the light receiving device 42B as a second output light.

With the optical receiver $3_5$ having such a construction, the signal light from the transmission system 2 is input to the terminal P1 of the optical circulator 40 and output from the terminal P2. The signal light output from the terminal P2 is input to the light reducing filter 37', and only the signal light component of the light frequency fs and the component in the vicinity thereof pass through the light reducing filter 37', and other signal light components are intercepted. The intercepted signal light components are reflected by the light reducing filter 37', returned to the terminal P2 of the optical circulator 40 and output from the terminal P3. Accordingly, from the terminal P3 of the optical circulator 40, the signal light component of the light frequency fs and the component in the vicinity thereof, contained in the received signal lights are extracted.

The extracted signal light is divided into two wavelengths by the optical wave-dividing device 41, according to the light frequency. When the frequency fs of the signal light from the transmission system 2 and the transmission center frequency of the light reducing filter 37' approximately coincide, the signal light component of the light frequency fs+fo is sent to the light receiving device 42A as the first output light of the optical wave-dividing device 41, and the signal light component of the light frequency fs−fo is sent to the light receiving device 42B as the first output light of the optical wave-dividing device 41.

On the other hand, when the frequency fs of the signal light from the transmission system 2 is shifted to the low frequency side (high frequency side), the first output light (the second output light) of the optical wave-dividing device 41 becomes small. Therefore, if a discrepancy is caused between the frequency fs of the signal light from the transmission system 2 and the transmission center frequency of the light reducing filter 37', the level of the electric signal output from respective light receiving devices 42A and 42B changes. Accordingly, by comparing the signal level from respective light receiving devices 42A and 42B using the comparator 43, the amount of discrepancy of the transmission center frequency of the light reducing filter 37' can be determined, and by sending the results to the control circuit 44, it becomes possible to control so that the transmission center frequency of the light reducing filter 37' follows the frequency fs of the signal light.

As described above, with the construction of the fifth embodiment, the component of the signal light affected by the polarization CLK frequency fo component can be reliably reduced using the light reducing filter 37', as in the case of the fourth embodiment.

A sixth embodiment of the present invention will now described.

Figure 14:
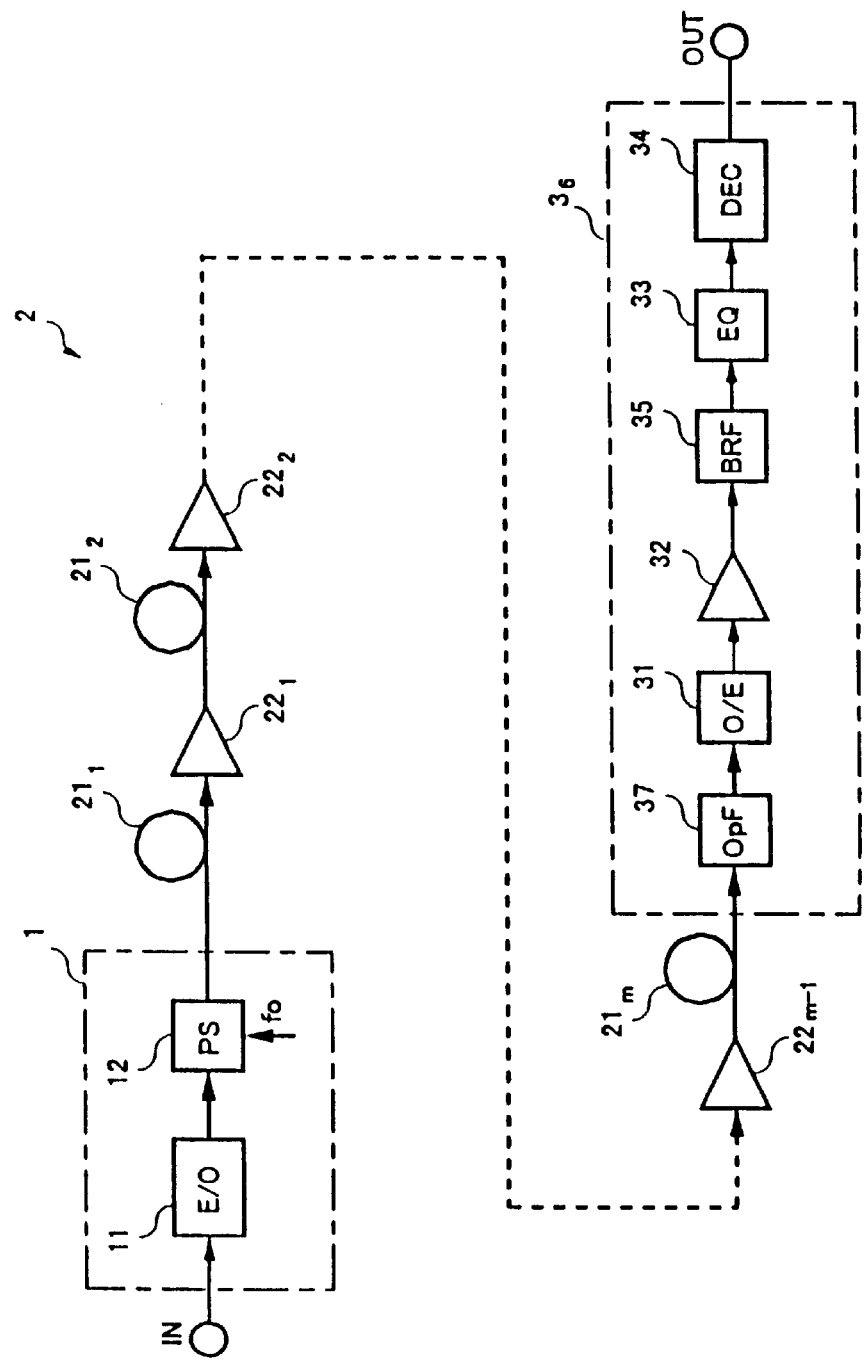
FIG. 14 is a block diagram showing the construction of a sixth embodiment of the present invention.

FIG. 14 is a block diagram showing the construction of an optical communication system using a synchronous polarization scrambler according to the sixth embodiment.

In FIG. 14, this optical communication system is characterized in that it includes a band reject filter 35 and a light reducing filter 37, respectively, in one optical receiver $3_6$. The arrangement of the band reject filter 35 and the light reducing filter 37 is the same as with the first and the third embodiments, and respective constructions other than those described above are similar to those of the first and the third embodiments.

By providing the band reject filter 35 and the light reducing filter 37 in one optical receiver $3_6$, the component of the signal light affected by the polarization CLK frequency fo component contained in the signal light from the transmission system 2 is first reduced by the light reducing filter 37, and when the electric signal passed through the light receiving device 31 and the amplifier 32 contains the polarization CLK frequency fo component, the component is reduced by the band reject filter 35. Therefore, the deterioration of the reception characteristic when the signal light is synchronously polarization-scrambled and transmitted can be prevented more reliably.

In addition, with the sixth embodiment described above, the band reject filter 35 and the light reducing filter 37 are provided in the optical receiver $3_6$. However the construction is not limited thereto, and the low-pass filter 36 used in the second embodiment may be used instead of the band reject filter 35. Moreover, the light reducing filter 37 in which the transmission center frequency is fixed may be substituted by the light reducing filter 37' used in the fourth and the fifth embodiments, in which the transmission center frequency is variable, and a function that the transmission center frequency follows the frequency fs of the signal light may be included.

A seventh embodiment of the present invention will now be described.

With general optical communication systems, it is important to monitor the state of the transmission system composed of the optical transmission path and the optical amplifier. In particular there is an increasing necessity to monitor the information relating to the polarization dependency of the transmission system. Therefore, with the seventh embodiment, the case is considered where the polarization CLK frequency component fo contained in the received signal is extracted on the optical receiver side, and the polarized state in the transmission path is monitored based on the polarization CLK frequency component fo.

Figure 15:
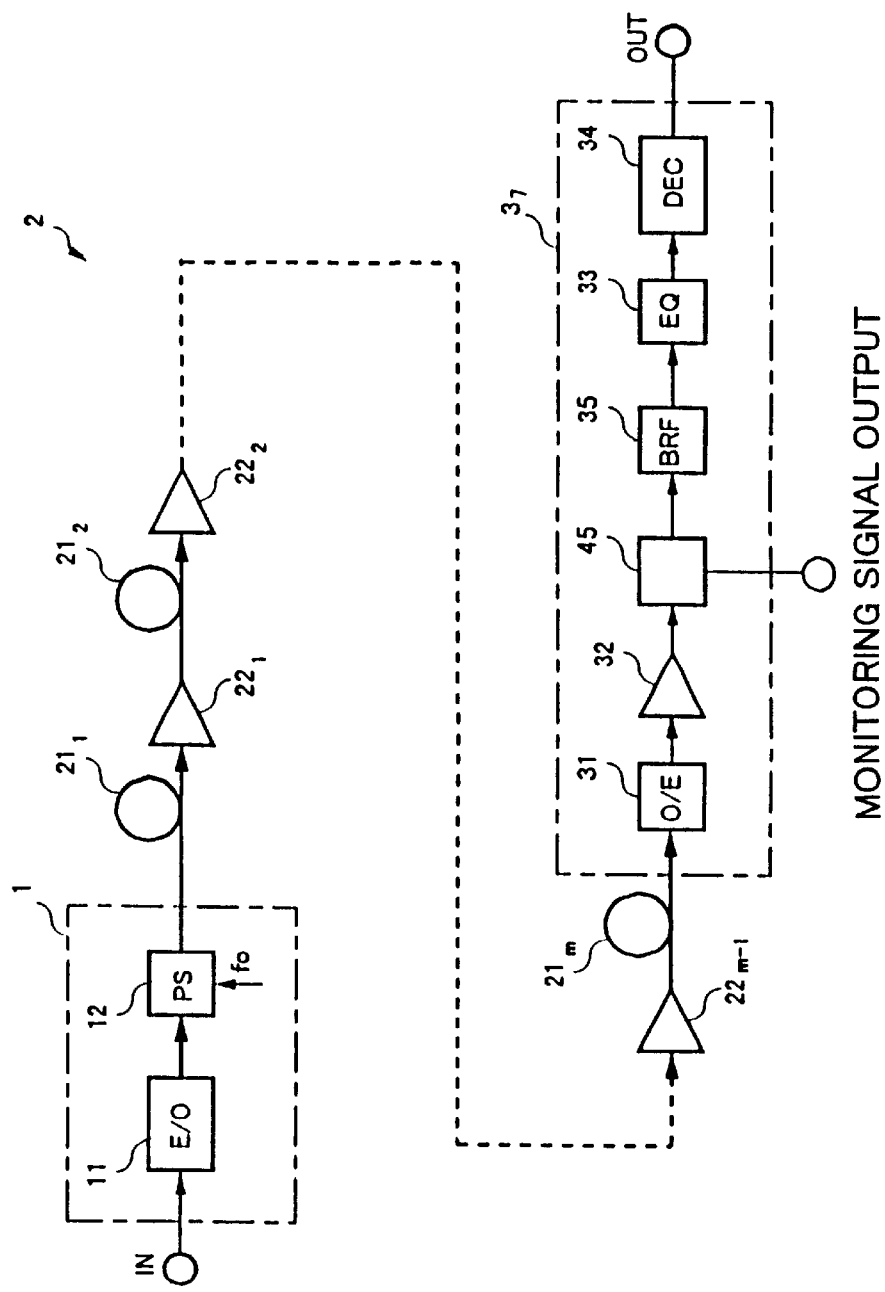
FIG. 15 is a block diagram showing the construction of a seventh embodiment of the present invention.

FIG. 15 is a block diagram showing the construction of an optical communication system using a synchronous polarization scrambler according to the seventh embodiment.

In FIG. 15, with this optical communication system, an optical receiver $3_7$ comprises, for example, an electric circulator 45 or the like as a signal extraction section between the amplifier 32 and the band reject filter 35, and the signal extracted by this electric circulator 45 is designated as the monitoring signal. The construction other than described above is similar to the construction of the first embodiment.

The electric circulator 45 has three terminals P1~P3, as with the optical circulator 40 shown in FIG. 12 described above. The terminal P1 is connected to the output terminal of the amplifier 32, the terminal P2 is connected to the input terminal of the band reject filter 35, and the terminal P3 is used as the output terminal of the monitoring signal. Between each terminal P1~P3, the signal light is transmitted only in the direction from the terminal P1 to the terminal P2, and in the direction from the terminal P2 to the terminal P3, and not in the other directions.

With the optical receiver $3_7$ having such an electric circulator 45, the signal light from the transmission system 2 is input to the terminal P1 of the electric circulator 45 through the light receiving device 31 and the amplifier 32 and output from the terminal P2. The signal light output from the terminal P2 is input to the band reject filter 35, and only the component of the polarization CLK frequency fo and the component in the vicinity thereof are intercepted and other signal components are sent to the equalizing filter 33. The intercepted signal components are reflected by the band reject filter 35, returned to the terminal P2 of the electric circulator 45 and output from the terminal P3. Accordingly, from the terminal P3 of the electric circulator 45, the component of the polarization CLK frequency fo and the component in the vicinity thereof, contained in the received signal are extracted.

The extracted signal contains the information reflecting the polarization dependency of the respective optical transmission paths $22_1$~$22_m$ and the respective optical amplifiers $22_1$~$22_{m-1}$ in the transmission system 2. Therefore, for example, by analyzing the extracted polarization CLK frequency fo in the time domain or in the frequency domain, monitoring of the polarized state in the transmission system 2 becomes possible. Here, this extracted signal is designated as the monitoring signal.

As described above, with the seventh embodiment, by providing the electric circulator 45 in the optical receiver $3_7$, and by extracting the signal reflected by the band reject filter 35 as the monitoring signal, an optical communication system which can monitor the polarized state in the transmission system 2 with a simple construction is provided. Monitoring of the polarized state in the transmission system 2 is difficult in a system in which polarization scrambling is not performed. Hence it is particularly effective to make it possible to monitor the state of polarization with a simple method in a system in which synchronous polarization scrambling is performed, as in this embodiment.

Figure 16:
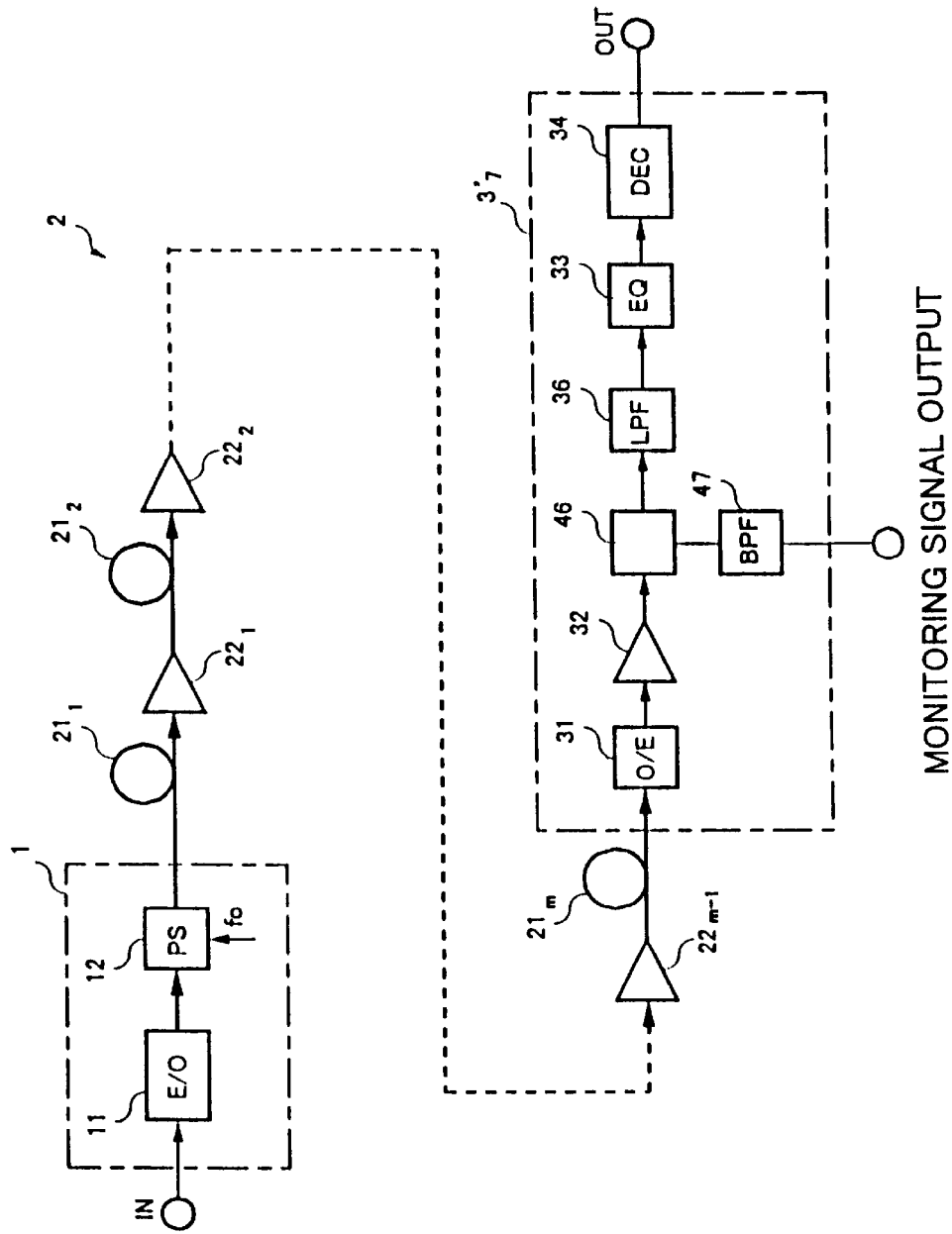
FIG. 16 is a first block diagram showing another construction for extracting the monitoring signal.

In the above seventh embodiment, the description has been given of the case wherein when the band reject filter is used for the optical receiver (as in the first embodiment), the state of polarization in the transmission system 2 is monitored. However the present invention is not limited to this. With regard to the case where the low-pass filter is used for the optical receiver (as in the second embodiment), the construction is such that, as shown in FIG. 16, an electric branching circuit 46 is provided between, for example, the amplifier 32 and the low-pass filter 36, and the signal branched by the electric branching circuit 46 is passed through a band-pass filter (BPF) 47 which passes only the component of the polarization CLK frequency fo and the component in the vicinity thereof to thereby extract the monitoring signal. As an electric filter for extracting the monitoring signal from the signal branched by the electric branching circuit 46, for example, a high-pass filter or the like which passes the frequency including and higher than the polarization CLK frequency fo may be used other than the band-pass filter 47.

Figure 17:
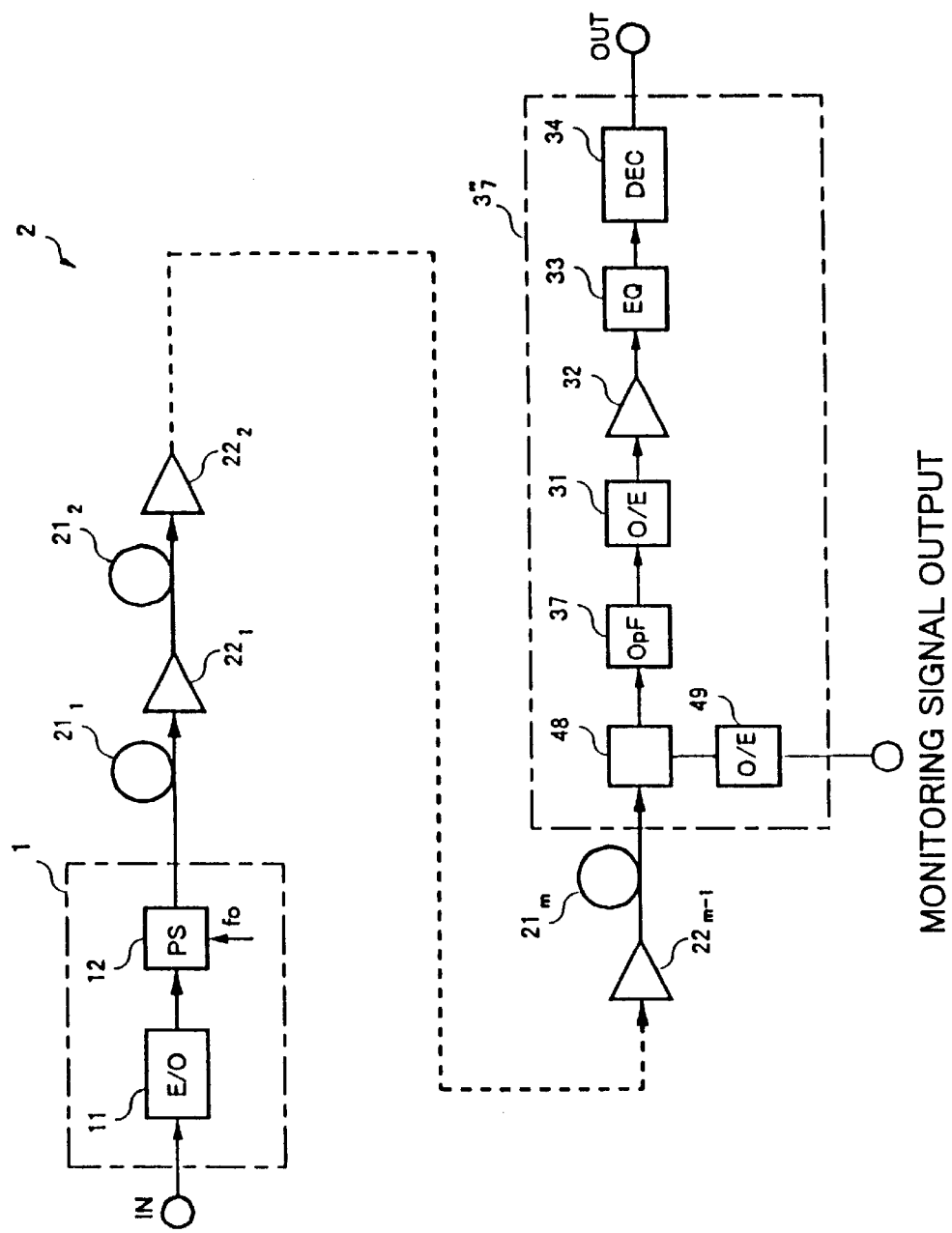
FIG. 17 is a second block diagram showing another construction for extracting the monitoring signal.

Furthermore, with regard to the case where the light reducing filter is used for the optical receiver (as in the third embodiment), as shown in FIG. 17, an optical circulator 48 (similar to the optical circulator 40 described above) is provided between, for example, the terminator of the optical transmission path $21_m$ and the light reducing filter 37. The signal light component which has been intercepted and reflected by the light reducing filter 37 is extracted by the optical circulator 48, and the extracted signal light component is converted to the electric signal by a light receiving device 49 and used as the monitoring signal. In this case, as in the fourth and fifth embodiments, a function that the transmission center frequency of the light reducing filter is directed to follow the frequency fs of the signal light may be provided.

An eighth embodiment of the present invention will now be described.

With the eighth embodiment, the description is given of the case where the monitoring signal extracted by the optical receiver is utilized as the clock signal used for the decision processing of the received signal.

Figure 18:
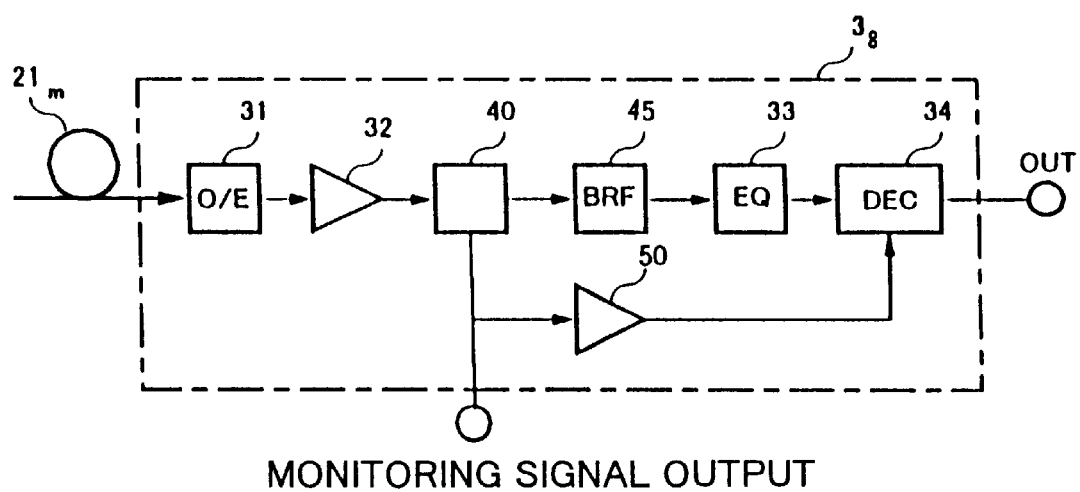
FIG. 18 is a block diagram showing the construction of an optical receiver in an eighth embodiment of the present invention.

FIG. 18 is a block diagram showing the construction of an optical receiver according to the eighth embodiment.

An optical receiver $3_8$ in FIG. 18 is constructed such that an amplifier 50 is provided as a clock generating section which amplifies a part of the monitoring signal extracted by the electric circulator 45 to the required level with regard to the optical receiver $3_7$ shown in FIG. 15 described above, and the output of the amplifier 50 is sent to the decision circuit 34 as the clock signal.

The signal of the polarization CLK frequency fo component extracted as the monitoring signal is a repetition frequency the same as the bit rate of the signal light. Hence it is preferable for the clock signal used for the decision of the transmission data. Heretofore, the clock signal has been obtained by retiming based on the received signal. However, if the signal of the extracted polarization CLK frequency fo component is used as the clock signal, an accurate clock can be obtained without performing the retiming processing. Hence, the construction of the decision circuit 34 can be made simple, while the decision accuracy can be improved.

A ninth embodiment of the present invention will now be described.

With the ninth embodiment, the case where the present invention is applied to a wavelength division-multiplexing optical communication system will be described.

Figure 19:
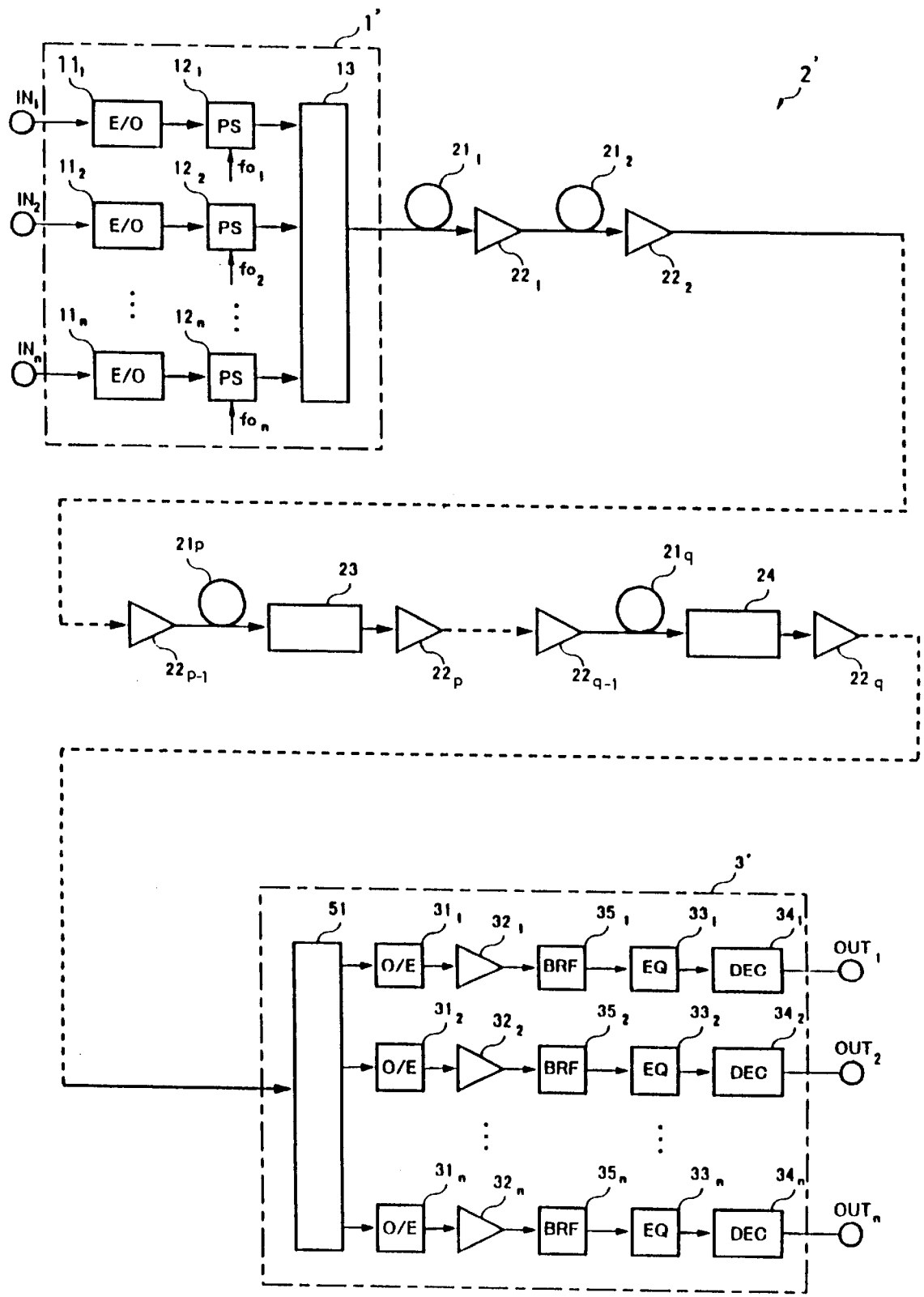
FIG. 19 is a block diagram showing the construction of a ninth embodiment of the present invention.

In FIG. 19, the construction of a wavelength division-multiplexing optical communication system using a synchronous polarization scrambler is shown.

The wavelength division-multiplexing optical communication system shown in FIG. 19 comprises an optical transmitter 1' which wavelength division multiplexes the synchronously polarization-scrambled signal light having a wavelength of n and outputs the signal light, a transmission system 2' for transmitting the signal light from the optical transmitter 1', and an optical receiver 3' for receiving the signal light from the transmission system 2' and performing the decision processing or the like for each wavelength.

The optical transmitter 1' comprises signal light generators $11_1$~$11_n$ and polarization scramblers $12_1$~$12_n$, and an optical wave-mixing device 13 for mixing the wavelengths of the signal light output from each polarization scrambler $12_1$~$12_n$ and sending the wavelength division- multiplexed signal light to the transmission system 2'. Each signal light generator $11_1$~$11_n$ and each polarization scrambler $12_1$~$12_n$ are the same as those used in the first embodiment.

The transmission system 2' comprises optical transmission paths $21_1$~$21_q$ and optical amplifiers $22_1$~$22_q$ which are connected in sequence, and is further provided with a gain equalizer 23 in the stage after the optical transmission path $21_p$, and a wavelength dispersion compensator 24 in the stage after the optical transmission path $21_q$. The gain equalizer 23 and the wavelength dispersion compensator 24 are inserted according to need, in order to remove the noise in this system.

The optical receiver 3' comprises an optical wave-dividing device 51 for dividing the wavelengths of the wavelength division-multiplexed signal light from the transmission system 2' for each wavelength, light receiving devices $31_1$~$31_n$ corresponding to each wavelength, amplifiers $32_1$~$32_n$, band reject filters $35_1$~$35_n$, equalizing filters $33_1$~$33_n$, and decision circuits $34_1$~$34_n$ Apart from the optical wave-dividing device 51, the construction for each wavelength is similar to in the first embodiment.

With such a wavelength division-multiplexing optical communication system, the signal light of each wavelength modulated according to the transmission data $IN_1$~$IN_n$ is synchronously polarization-scrambled by each polarization scrambler $12_1$~$12_n$, then wave-mixed by the optical wave-mixing device 13 and transmitted to the transmission system 2'. The wavelength division-multiplexed signal light reaching the optical receiver 3' through the transmission system 2' is wave-divided and received and processed for each wavelength by the optical wave-dividing device 51. Each reception processing is similar to that of the first embodiment, and the polarization CLK frequency fo component and the component in the vicinity thereof contained in the received signal are reduced by the band reject filters $35_1$~$35_n$ and the decision processing and the like are then performed.

According to the ninth embodiment, as described above, in the case of performing the synchronous polarization scrambling with the wavelength division-multiplexing optical communication system, the deterioration of the reception characteristic can be prevented by providing the band reject filters $35_1$~$35_n$ for each wavelength with respect to the optical receiver 3'.

In addition, with the ninth embodiment described above, the optical receiver uses the band reject filter 35. However the present invention is not limited to this construction, and the present invention may be applied to optical communication systems having a construction shown in FIG. 16 and FIG. 17 described above.

A tenth embodiment of the present invention will now be described.

In general, with optical communication systems, the state of the transmission system is often monitored by transmitting the monitoring control signal between the optical transmitter/receivers and repeaters, or the like. The transmission of this monitoring control signal has been realized by, for example, slightly modulating the intensity of the signal light modulated according to the transmission data, with a low-frequency signal. With the tenth embodiment, attention is given to the fact that when the signal light is transmitted after being synchronously polarization-scrambled, the polarization CLK frequency fo component can be extracted on the reception side, and description is given for the case where the state of the transmission system is monitored by superimposing the monitoring control signal on the polarization modulation signal, and transmitting the monitoring control signal between the optical transmitter and the optical receiver.

Figure 20:
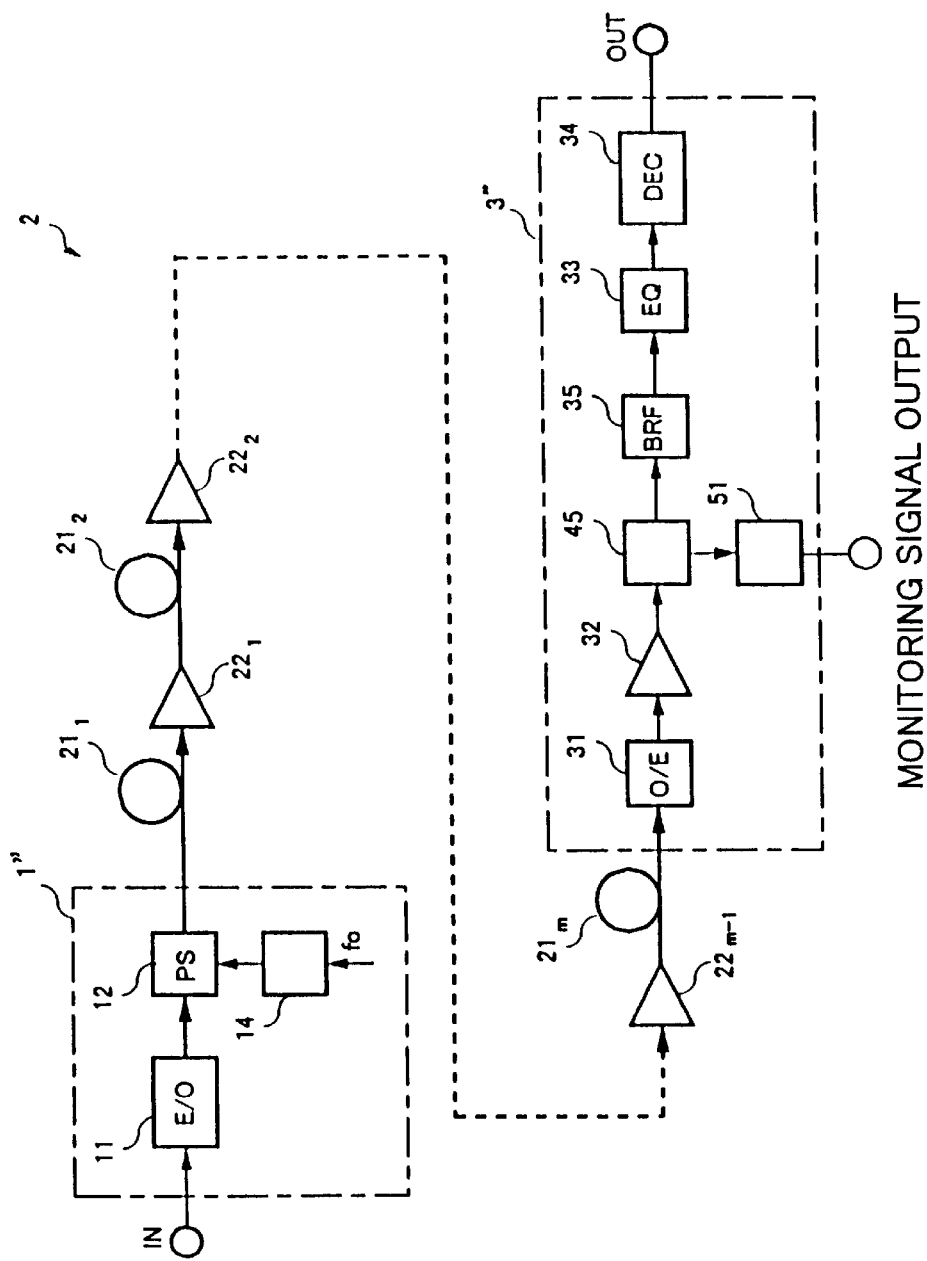
FIG. 20 is a block diagram showing the construction of a tenth embodiment of the present invention.
Figure 21:
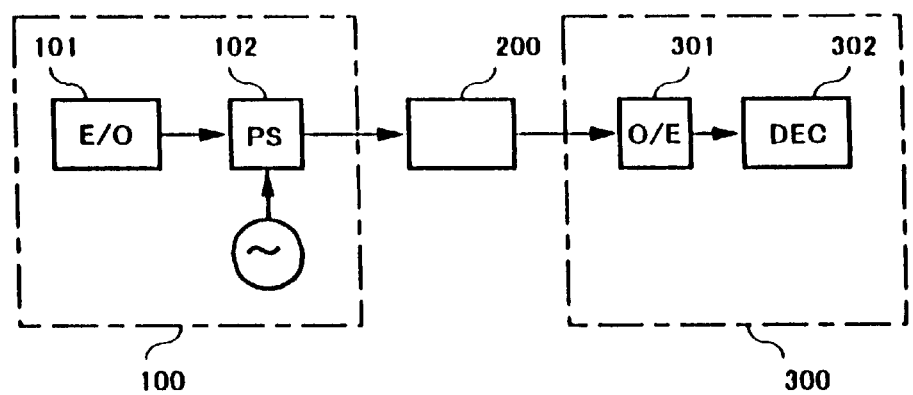
FIG. 21 is a block diagram showing the construction of a conventional optical communication system using a polarization scrambler.

FIG. 20 is a block diagram showing the construction of an optical communication system using the synchronous polarization scrambler according to the tenth embodiment.

In FIG. 20, where this optical communication system is different from the construction in the seventh embodiment of the optical communication system (see FIG. 15) is that an optical transmitter 1" includes a modulator 14 as the monitoring control signal superimposing section, and an optical receiver 3" includes a demodulator 51 as the monitoring control signal demodulating section. The construction of the optical transmitter 1" and the optical receiver 3" other than as described above and the construction of the transmission system 2 is similar to that of the seventh embodiment.

The modulator 14 inputs the polarization modulation signal of the polarization CLK frequency fo, modulates the intensity, frequency or the phase of the polarization-modulated signal according to the monitoring control signal, and outputs the modulated signal to the polarization scrambler 12. The degree of modulation applied to the polarization modulation signal is so set that it does not affect the synchronous polarization scrambling in the polarization scrambler 12 and so that demodulation by the optical receiver 3" is possible.

With such an optical communication system, in the optical transmitter 1", the signal light synchronously polarization-scrambled with the polarization modulation signal on which the monitoring control signal is superimposed is transmitted via the transmission system 2 to the optical receiver 3". With the optical receiver 3", as in the case of the seventh embodiment, the signal light from the transmission system 2 is input to the band reject filter 35 through the light receiving device 31, the amplifier 32 and the electric circulator 45, and the polarization CLK frequency fo component and the component in the vicinity thereof are reflected by the band reject filter 35 and output from the terminal P3 of the electric circulator 45. Since the signal of the extracted polarization CLK frequency fo component has been modulated according to the monitoring control signal, the monitoring control signal can be regenerated using the demodulator 51.

According to the tenth embodiment, as described above, by transmitting the signal light synchronously polarization-scrambled with the polarization modulation signal on which the monitoring control signal is superimposed, and extracting the signal of the polarization CLK frequency fo component with the optical receiver 3" to thereby demodulate the monitoring control signal, the monitoring control signal can be transmitted between the optical transmitter and the optical receiver with a simple method.

In addition, with the above tenth embodiment, description has been given of the case where the present invention is applied to an optical communication system having a construction wherein the signal reflected by the band reject filter 35 is extracted by the electric circulator 45 on the optical receiver side. However the present invention is not limited to this construction, and the present invention may be applied to optical communication systems having the construction shown in FIG. 16~FIG. 18 described above.

What is claimed is:

1. An optical reception apparatus for receiving and processing a synchronously polarization-scrambled signal light via an optical transmission system, using a synchronous polarization scrambler which scrambles the polarized state of the signal light in accordance with a polarization modulation signal of a repetition frequency which coincides with a bit rate of the signal light, said apparatus comprising:

a filter reducing a noise component generated based on the synchronous polarization scrambling performed with respect to at least one of the signal light before photoelectric conversion and an electric signal after photoelectric conversion.

2. An optical reception apparatus according to claim 1, wherein using the electric signal after photoelectric conversion, said filter comprises a band reject filter having a rejection bandwidth centered on said repetition frequency, which intercepts only noise components in the rejection bandwidth.

3. An optical reception apparatus according to claim 2, wherein using said band reject filter, an amount of attenuation of the noise component in the rejection bandwidth is not less than 3 dB.

4. An optical reception apparatus according to claim 2, wherein using said band reject filter, the rejection bandwidth is not less than 100 Hz.

5. An optical reception apparatus according to claim 2, wherein using said band reject filter, a group delay amount in a range of from DC to 0.8 times the repetition frequency is not higher than 10% of the period for one bit given from the bit rate.

6. An optical reception apparatus according to claim 1, wherein using the electric signal after photoelectric conversion, said filter comprises a low-pass filter which intercepts noise components equal to or higher than the repetition frequency.

7. An optical reception apparatus according to claim 6, wherein using said low-pass filter, an amount of attenuation of noise components equal to or higher than the repetition frequency is not less than 3 dB.

8. An optical reception apparatus according to claim 6, wherein using said low-pass filters, a group delay amount in a range of from DC to 0.8 times the repetition frequency is not higher than 10% of the period for one bit given from the bit rate.

9. An optical reception apparatus according to claim 1, wherein using the signal light before photoelectric conversion, said filter comprises a light reducing filter having a narrow bandwidth capable of intercepting the noise component affected by the repetition frequency.

10. An optical reception apparatus according to claim 9, wherein said light reducing filter has a bandwidth of which a center frequency corresponds to the frequency of the signal light and which is narrower than twice the width of the repetition frequency.

11. An optical reception apparatus according to claim 9, wherein said filter comprises a light reducing filter control section which directs a center frequency in the bandwidth of said light reducing filter to follow the frequency of the signal light.

12. An optical reception apparatus according to claim 1, further comprising a signal extraction section for extracting a signal of the repetition frequency component, in a stage prior to said filter, the signal extracted by said signal extraction section being output as a monitoring signal for monitoring a polarization dependence of the optical transmission system.

13. An optical reception apparatus according to claim 12, wherein said signal extraction section comprises a circulator extracting the noise component intercepted and reflected by said filter.

14. An optical reception apparatus according to claim 12, wherein said signal extraction section comprises a branching section branching a part of the input signal sent to said filter, and a band-pass filter passing only the component of said repetition frequency and the component in the vicinity thereof among the signals branched by said branching section.

15. An optical reception apparatus according to claim 12, including a clock generating section generating a clock signal for the reception processing, using the signal extracted by said signal extraction section.

16. An optical communication system, comprising:

a light transmitter having a synchronous polarization scrambler scrambling a polarized state of a signal light according to a polarization modulation signal of a repetition frequency which coincides with a bit rate of the signal light, and transmitting the synchronously polarization-scrambled signal light to an optical transmission system; and a light receiver receiving and processing said signal light transmitted from said light transmitter via said optical transmission system, wherein said light receiver comprises a filter reducing the noise component generated based on the synchronous polarization scrambling performed with respect to at least one of a signal light before photoelectric conversion and an electric signal after photoelectric conversion.

17. An optical communication system using a synchronous polarization scrambler of claim 16, wherein said light transmitter comprises a monitoring control signal superimposing section superimposing a monitoring control signal showing a state of said optical transmission system on the polarization modulation signal, and said light receiver comprises a signal extraction section extracting a signal of the repetition frequency component in the stage prior to said filter, and a monitoring control signal demodulating section demodulating the monitoring control signal based on the signal extracted by said signal extraction section.

18. An optical communication system, comprising:

a synchronous polarization scrambler scrambling a polarized state of a signal light according to a polarization modulation signal having a repetition frequency approximately coincident with a bit rate of the signal light to produce a synchronously polarization-scrambled signal light; and an optical receiver receiving the synchronously polarization-scrambled signal light and having a noise reducing section reducing a noise component generated based upon said synchronous polarization scrambler scrambling the signal light.

* * * * *